US008265215B1

(12) United States Patent
Chow et al.

(10) Patent No.: US 8,265,215 B1
(45) Date of Patent: *Sep. 11, 2012

(54) METHOD AND SYSTEM FOR DETERMINING SYMBOL BOUNDARY TIMING IN A MULTICARRIER DATA TRANSMISSION SYSTEM

(75) Inventors: Jacky S. Chow, Mountain View, CA (US); Pak Hei Matthew Leung, Shatin (CN); King-Fuk Luk, Ma On Shan (CN); Nicholas Philip Sands, Menlo Park, CA (US); Eugene Yuk-Yin Tang, Richmond Hill, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 12/628,738

(22) Filed: Dec. 1, 2009

Related U.S. Application Data

(63) Continuation of application No. 10/866,327, filed on Jun. 9, 2004, now Pat. No. 7,643,582.

(51) Int. Cl.
*H04L 7/00* (2006.01)
*H04B 1/38* (2006.01)
(52) U.S. Cl. ........ 375/354; 375/355; 375/316; 375/295; 375/240.28; 375/219
(58) Field of Classification Search .................. 375/219, 375/240.26, 240.27, 240.28, 295, 354, 355, 375/357, 359, 362, 363, 371
See application file for complete search history.

(56) References Cited

U.S. PATENT DOCUMENTS

| 4,238,746 | A | | 12/1980 | McCool et al. |
| 4,791,390 | A | | 12/1988 | Harris et al. |
| 4,811,342 | A | | 3/1989 | Huang |
| 5,440,347 | A | | 8/1995 | Guan |
| 5,519,730 | A | | 5/1996 | Jasper et al. |
| 5,619,542 | A | * | 4/1997 | Gurney et al. ............. 375/371 |
| 5,732,113 | A | | 3/1998 | Schmidl et al. |
| 5,809,086 | A | * | 9/1998 | Ariyavisitakul ........... 375/332 |
| 5,901,180 | A | | 5/1999 | Aslanis et al. |
| 5,995,568 | A | | 11/1999 | Molnar et al. |
| 6,021,167 | A | | 2/2000 | Wu |

(Continued)

FOREIGN PATENT DOCUMENTS

EP 0 969 608 1/2000

(Continued)

OTHER PUBLICATIONS

Chow, J.S. et al., "ADSL Standard and Recommended Training Sequence for Time Domain Equalizers (TQE) with DMT," ANSI T1E1.4 Committee Contribution No. 93-086, Apr. 15, 1993.

(Continued)

*Primary Examiner* — Sam K Ahn
*Assistant Examiner* — Linda Wong

(57) ABSTRACT

Improved techniques for acquiring symbol boundary timing at a receiver of a multicarrier data transmission system during a training sequence are disclosed. One aspect is symbol boundary determination at a receiver wherein minimal interference is used as a criterion in selecting from a plurality of potential symbol boundary timings. The symbol boundary determination at the receiver can be performed in a time domain or a frequency domain manner. Another aspect pertains to an improved training sequence wherein pairs of identical symbols are transmitted by a transmitter. These symbols can be supplied to the transmitter in a time domain or a frequency domain manner.

20 Claims, 20 Drawing Sheets

U.S. PATENT DOCUMENTS

| | | | |
|---|---|---|---|
| 6,134,283 | A | 10/2000 | Sands et al. |
| 6,279,022 | B1 | 8/2001 | Miao et al. |
| 6,434,119 | B1 | 8/2002 | Wiese et al. |
| 6,519,275 | B2 | 2/2003 | Callaway et al. |
| 6,538,986 | B2 | 3/2003 | Isaksson et al. |
| 6,584,164 | B1 | 6/2003 | Tuukkanen |
| 6,735,244 | B1 | 5/2004 | Hasegawa et al. |
| 6,768,714 | B1 * | 7/2004 | Heinonen et al. ............ 370/208 |
| 6,888,790 | B2 | 5/2005 | Kilani |
| 6,888,886 | B2 | 5/2005 | Ito |
| 6,928,110 | B2 | 8/2005 | Ougi et al. |
| 6,944,244 | B2 | 9/2005 | Belotserkovsky et al. |
| 6,954,421 | B2 | 10/2005 | Kuwabara et al. |
| 6,985,548 | B1 | 1/2006 | Jabbar et al. |
| 6,999,517 | B1 | 2/2006 | Bombay et al. |
| 7,016,429 | B1 | 3/2006 | Dogan et al. |
| 7,039,000 | B2 | 5/2006 | You et al. |
| 7,088,782 | B2 | 8/2006 | Mody et al. |
| 7,245,674 | B2 | 7/2007 | Liang |
| 7,254,196 | B2 | 8/2007 | Kriedte et al. |
| 7,286,617 | B2 | 10/2007 | Vanderperren et al. |
| 7,426,232 | B2 | 9/2008 | Matsuoka et al. |
| 7,436,881 | B2 | 10/2008 | Nedic et al. |
| 7,453,794 | B2 | 11/2008 | Fang et al. |
| 2002/0075797 | A1 * | 6/2002 | Kilani ............................ 370/208 |
| 2003/0012259 | A1 * | 1/2003 | Callaway et al. ............ 375/140 |
| 2004/0082356 | A1 * | 4/2004 | Walton et al. ................. 455/522 |
| 2004/0125862 | A1 | 7/2004 | Li et al. |
| 2004/0131011 | A1 | 7/2004 | Sandell et al. |
| 2005/0135432 | A1 | 6/2005 | Kelley et al. |

FOREIGN PATENT DOCUMENTS

| | | |
|---|---|---|
| EP | 1 035 699 | 9/2000 |
| EP | 1 313 283 | 5/2003 |
| EP | 1 414 208 | 4/2004 |
| WO | WO 2004/028055 | 4/2004 |

OTHER PUBLICATIONS

Chow, J.S. et al., "Equalizer Training Algorithms for Multicarrier Modulation Systems," 1993 International Conference on Communications, pp. 761-765.

Cioffi, J.M. et al., "G.vdsl: Digital Duplexing: VDSL Performance Improvement by Aversion of Frequency Guard Bands," ITU Temporary Document NT-041, Nashville Tennessee, Nov. 1999.

Hanzo, L. et al., "Single- and Multi-carrier Quadrature Amplitude Modulation," Chapter 21, Wiley, ISBN 0471492396, 2000.

International Search Report and Written Opinion dated Oct. 6, 2005 for corresponding PCT Application No. PCT/US2005/020075.

International Search Report and Written Opinion dated Oct. 6, 2005 for corresponding PCT Application No. PCT/US2005/020084.

International Search Report and Written Opinion dated Sep. 26, 2005 for corresponding PCT Application No. PCT/US2005/019986.

International Search Report and Written Opinion dated Sep. 30, 2005 for corresponding PCT Application No. PCT/US2005/020073.

Leus and Moonen, "Per-Tone Equalization for MIMO OFDM Systems," IEEE Transactions on Signal Processing, vol. 51, No. 11, Nov. 2003.

Minn et al., "A Robust Timing and Frequency Synchronization for OFDM Systems," IEEE Transactions on Wireless Communications, vol. 2, No. 4, Jul. 2003.

Mochizuki et al., "A High Performance Frequency and Timing Synchronization Technique of OFDM," IEEE Globecom 1998, Piscataway, NJ, vol. 6, Nov. 8, 1998, pp. 3443-3448.

Platbrood et al., "Analysis of Coarse Frequency Synchronisation for Hiperlan Type-2,", Vehicular Technology Conference, IEEE VTS 50th, Amsterdam, Netherlands, Sep. 19-22, 1999, pp. 688-692.

Van Acker et al., "Per Tone Equalization for DMT-Based Systems," IEEE Transactions on Communications, vol. 49, No. 1, Jan. 2001.

Van Acker et al., "Per Tone Echo Cancellation for DMT-Based Systems," IEEE Transactions on Communications, vol. 51, No. 9, Sep. 2003.

* cited by examiner

METHOD AND SYSTEM FOR DETERMINING SYMBOL BOUNDARY TIMING IN A MULTICARRIER DATA TRANSMISSION SYSTEM

CROSS-REFERENCE TO RELATED APPLICATIONS

This application is a continuation of U.S. patent application Ser. No. 10/866,327, filed Jun. 9, 2004, now U.S. Pat. No. 7,643,582, which is related to (i) U.S. patent application Ser. No. 10/865,256, filed Jun. 9, 2004, entitled "TRAINING SEQUENCE FOR SYMBOL BOUNDARY DETECTION IN A MULTICARRIER DATA TRANSMISSION SYSTEM," and incorporated herein by reference; (ii) U.S. patent application Ser. No. 10/865,133, filed Jun. 9, 2004, entitled "TRAINING SEQUENCE FOR CHANNEL ESTIMATION IN A DATA TRANSMISSION SYSTEM," and incorporated herein by reference; and (iii) U.S. patent application Ser. No. 10/865,093, now U.S. Pat. No. 7,561,626, filed Jun. 9, 2004, entitled "METHOD AND SYSTEM FOR CHANNEL ESTIMATION IN A DATA TRANSMISSION SYSTEM," and incorporated herein by reference.

BACKGROUND OF THE INVENTION

1. Field of the Invention

The present invention relates to data transmission systems and, more particularly, to multicarrier data transmission systems.

2. Description of the Related Art

A conventional voice-band modem can connect computer users end-to-end through the Public Switched Telephone Network (PSTN). However, the transmission throughput of a voice-band modem is limited to below 40 Kbps due to the 3.5 KHz bandwidth enforced by bandpass filters and codes at the PSTN interface points. On the other hand, the twisted-pair telephone subscriber loop of a computer user has a much wider usable bandwidth. Depending on the length of the subscriber loop, the bandwidth at a loss of 50 dB can be as wide as 1 MHz. Transmission systems based on local subscriber loops are generally called Digital Subscriber Lines (DSL).

As consumer demand has increased for interactive electronic access to entertainment (e.g. video-on-demand) and information (Internet) in digital format, this demand has effectively exceeded the capabilities of conventional voice-band modems. Various delivery approaches have been proposed, such as optical fiber links to every home, direct satellite transmission, and wideband coaxial cable. However, these approaches are often too costly. Hence, cheaper alternatives have emerged, such as the cable modem which uses existing coaxial cable connections to homes and various high bit rate DSL modems which use the existing twisted-pair of copper wires connecting a home to the telephone company's central office (CO).

One DSL technique for high-speed data communications is Asymmetrical Digital Subscriber Line (ADSL) signaling for the telephone loop that has been defined by standards as a communication system specification that provides a low-rate data stream from the residence to the CO (upstream), and a high-rate data stream from the CO to the residence (downstream). The ADSL standard provides for operation without affecting conventional voice telephone communications, e.g., Plain Old Telephone Service (POTS). The ADSL upstream channel only provides simple control functions or low-rate data transfers. The high-rate downstream channel provides a much higher throughput. This asymmetrical information flow is desirable for applications such as video-on-demand (VOD).

An ADSL modem operates in a frequency range that is higher than the voice-band; this permits higher data rates. However, the twisted-pair subscriber line has distortion and losses which increase with frequency and line length. Thus, the ADSL standard data rate is determined by a maximum achievable rate for a length of subscriber lines.

The ADSL standard uses Discrete Multi-Tone (DMT) modulation with the DMT spectrum divided into two-hundred fifty-six 4.3125 KHz carrier bands and a quadrature amplitude modulation (QAM) type of constellation is used to load a variable number of bits onto each carrier band independently of the other carrier bands.

The number of bits per carrier is determined during a training period when a test signal is transmitted through the subscriber line to the receiving modem. Based on the measured signal-to-noise ratio of the received signal, the receiving modem determines the optimal bit allocation, placing more bits on the more robust carrier bands, and returns that information back to the transmitting modem.

The modulation of the coded bits is performed very efficiently by using a 512-point inverse fast Fourier transform (IFFT) to convert the frequency domain coded bits into a time domain signal which is put on the twisted-pair by a Digital-to-Analog (D/A) converter using a sample rate of 2.208 MHz (4.3125×512). The receiving ADSL modem samples the signal and recovers the coded bits with a fast Fourier transform (FFT).

A typical DMT system utilizes a transmitter inverse FFT and a receiver forward FFT. Ideally, the channel frequency distortion can be corrected by a frequency domain equalizer following the receiver FFT. However, the delay spread of the channel in the beginning of the receiver FFT block contains inter-symbol interference from the previous block. As this interference is independent of the current block of data, it cannot be canceled just by the frequency domain equalizer. The typical solution adds a block of prefix data in front of the FFT data block on the transmitter side before the block of FFT data is sent to the D/A converter. The prefix data is the repeat copy of the last section of FFT data block.

On the receiver side, the cyclic prefix is removed from the received signal. If the length of the channel impulse response is shorter than the prefix length, inter-symbol interference from the previous FFT data block is completely eliminated. Frequency domain equalizer techniques are then applied to remove intra-symbol interference among DMT subchannels. However, since the channel impulse response varies on a case by case basis, there is no guarantee that the length of the impulse response is shorter than the prefix length. An adaptive time domain equalizer is typically required to shorten the length of the channel response within the prefix length.

Time domain equalizer training procedures have been studied previously, see "Equalizer Training Algorithms for Multicarrier Modulation Systems," J. S. Chow, J. M. Cioffi, and J. A. C. Bingham, 1993 International Conference on Communications, pages 761-765, Geneva, May 1993. A corresponding training sequence has also been specified in "ADSL standard and Recommended Training Sequence for Time domain Equalizers (TQE) with DMT," J. S. Chow, J. M. Cioffi, and J. A. C. Bingham, ANSI T1E1.4 Committee Contribution number 93-086.

Besides ADSL, another DSL technique for high-speed data communications over twisted-pair phone lines is known as Very High Speed Digital Subscriber Lines (VDSL). VDSL is intended to facilitate transmission rates greater than that offered by the ADSL. The multi-carrier transmission schemes used with VDSL can be Discrete Multi-Tone (DMT) modulation, or some other modulation scheme such as Discrete Wavelet Multi-Tone (DWMT) modulation, Quadrature Amplitude Modulation (QAM), Carrierless Amplitude and Phase modulation (CAP), Quadrature Phase Shift Keying (QPSK), or vestigial sideband modulation.

A common feature of the above-mentioned transmission systems is that twisted-pair phone lines are used as at least a part of the transmission medium that connects a central office (e.g., telephone company) to users (e.g., a residence or business). Even though fiber optics may be available from a central office to the curb near a user's residence, twisted-pair phone lines are used to bring the signals from the curb into the user's home or business.

One conventional frame synchronization technique for a system, using frequency division duplexing (FDD) or echo cancelling to provide duplexed operation, required the transmission of a predetermined sequence of data which was received by a receiver and then correlated with a predetermined stored sequence of data to determine the adjustment required in order to yield synchronization. This frame synchronization technique requires a special start-up training sequence to obtain the frame synchronization.

When a data transmission system is operating in a time-division duplexed (TDD) manner, the transmitters and receivers of the central office and remote units must be synchronized in time so that transmission and reception do not overlap in time. In a data transmission system, downstream transmissions are from a central side transmitter to one or more remote side receivers, and upstream transmissions are from one or more remote side transmitters to a central side receiver. The central side transmitter and receiver can be combined as a central side transceiver, and the remote side transmitter and receiver can be combined as a remote side transceiver.

Generally speaking, in a time-division duplexed system, upstream signals are alternated with downstream signals. On channels subject to crosstalk (NEXT interference) between multiple connections, if time-division duplexing is used, synchronization must be established and maintained among all units so affected. Typically, the upstream transmissions and the downstream transmissions are separated by a guard interval or a quiet period. The guard interval is provided to enable the transmission system to reverse the direction in which data is being transmitted so that a transmission can be received before the transmission in the opposite direction occurs. Some transmission schemes divide upstream and downstream transmissions into smaller units referred to as frames. These frames may also be grouped into superframes that include a series of downstream frames and a series of upstream frames, as well as guard intervals between the two.

In multi-carrier data transmission systems, high speed data transfer can be performed using a plurality of sub-carriers. A Discrete Multi-Tone (DMT) symbol is transmitted using the plurality of sub-carriers. A cyclic prefix is inserted to maintain the circularity of DMT symbols. A cyclic prefix is formed by adding the last several samples to the beginning of a DMT symbol. The length of the cyclic prefix can be represented as Lcp. Likewise, a cyclic suffix can also be used for the same purpose and it is formed by adding the first few samples to the end of a DMT symbol. The length of the cyclic suffix can be represented as Lcs.

In addition, the cyclic suffix or cyclic prefix can be used for aligning the DMT transmit and receive windows in digital duplexing. See, e.g., John M. Cioffi et al. "G.Vdsl: Digital Duplexing: VDSL Performance Improvement by Aversion of Frequency Guard Bands," ITU Temporary Document NT-041, Nashville, Tenn., November 1999, which is incorporated herein by reference. Although the cyclic prefix is used as the mechanism to ensure circularity, the same principle applies to cyclic suffixes. Similarly, the cyclic suffix is used for aligning symbols in digital duplexing, but the same purpose can be fulfilled by either the cyclic prefix or the cyclic suffix, or a combination of both.

FIG. 1 is a diagram illustrating a representative, conventional DMT symbol 10 having a cyclic prefix 12 of length Lcp and a cyclic suffix 14 of length Lcs. A transmitter window is often applied to DMT symbols and the last $\beta$ samples of the cyclic suffix of the preceding DMT symbol and the first $\beta$ samples of the cyclic prefix of the latter DMT symbol are overlapped and added. The resulting length of the DMT symbol is thus defined as $$\text{dmtsymbol\_length}=2*Nsc+Lcp+Lcs-\beta \qquad (\text{Eq. 1})$$

where Nsc is the number of sub-carriers.

In determining the symbol boundary timing for multicarrier systems such as OFDM (orthogonal frequency division multiplexing—a generalization of DMT systems), a conventional method is described in L. Hanzo et al., "Single- and Multi-carrier Quadrature Amplitude Modulation," Wiley, ISBN 0471492396, which is hereby incorporated herein by reference. By exploiting the cyclic prefix structure, a cross-correlation function is computed. The symbol delay index is chosen to maximize such a function. That is, the cross-correlation function, G(j), is formed with $$G(j) = \sum_{n=0}^{Lcp-1} r(j+n) \cdot r(j+n+2 \cdot N_{sc}) \qquad (\text{Eq. 2})$$

where r refers to received samples. Further, the delay index, $m_d$, is selected to be x such that $$G(m_d) = \max_x \{G(x)\} \text{ for all } x \qquad (\text{Eq. 3})$$

Accordingly, the conventional method seeks a symbol delay index to maximize the received signal energy. However, these high-speed data communication systems are subject to interference, e.g., inter-symbol interference and/or inter-carrier interference, which hinders operation. Inter-symbol interference is due to imperfections in the subscriber loop (i.e., non-ideal channel response), whereas inter-carrier interference is interference from one subcarrier to another. With longer loops or greater channel spread, the impact of such interference tends to worsen. Thus, there is always a need for improved approaches to determinate of appropriate symbol boundaries so that greater performance can be achieved.

SUMMARY OF THE INVENTION

Broadly speaking, the invention pertains to improved techniques for acquiring symbol boundary timing at a receiver of a multicarrier data transmission system during a training sequence. One aspect is symbol boundary determination at a receiver wherein minimal interference is used as a criterion in selecting from a plurality of potential symbol boundary timings. The symbol boundary determination at the receiver can be performed in a time domain or a frequency domain manner. Another aspect pertains to an improved training sequence wherein pairs of identical symbols are transmitted by a transmitter. These symbols can be supplied to the transmitter in a time domain or a frequency domain manner. Different embodiments of the invention can incorporate one or more of these aspects.

The invention can be implemented in numerous ways, including as a method, system, device, apparatus, graphical user interface, or computer readable medium. Several embodiments of the invention are discussed below.

As a method for detecting received symbol boundary timing in a multicarrier system, one embodiment of the invention includes at least the acts of: estimating noise due to inter-carrier and inter-symbol interference for different choices of symbol boundary timing; and selecting the choice of symbol boundary timing with the least noise due to inter-carrier and inter-symbol interference.

As a method for detecting received symbol boundary timing in a multicarrier system, another embodiment of the invention includes at least the acts of: receiving a series of received training signals over a wire-based channel; storing at least three of the series of received training signals to a buffer; determining difference values for a pair of consecutive received training signals stored in the buffer; selecting one of the difference values; and determining the received symbol boundary timing based on the selected one of the difference values.

As a method for detecting received symbol boundary timing in a multicarrier system, yet another embodiment of the invention includes at least the acts of: receiving a series of received training signals over a wire-based channel; determining a plurality of correlation values for a plurality of pairs of received training signals, where each respective pair of training symbols were identical when transmitted; selecting one of the correlation values; and determining the received symbol boundary timing based on the selected one of the correlation values.

As a multicarrier data transmission system one embodiment of the invention includes at least one transmitter and at least one receiver. The transmitter includes at least: a line encoder that encodes data into symbols to be transmitted; training symbols; a switch that selects symbols for transmission either the training symbols or the symbols pertaining to the encoded data from the line encoder; a multicarrier modulation unit for modulating the symbols into modulated symbols; and a digital-to-analog converter for converting the modulated symbols into analog signals. The receiver includes at least: an analog-to-digital converter for converting the analog signals into digital samples; a symbol timing unit for examining the analog signals to produce correlation values for a plurality of different potential symbol timing boundaries; a multicarrier demodulation unit for demodulating the digital samples into symbols; and a line decoder that decodes the symbols into data. The transmitter transmits pairs of identical training symbols, and the symbol timing unit produces the correlation values with respect to the pairs of identical training symbols as received at the receiver.

As a computer readable medium including at least computer program code for detecting received symbol boundary timing in a multicarrier system, one embodiment of the invention includes at least: computer program code for estimating noise due to inter-carrier and inter-symbol interference for different choices of symbol boundary timing; and computer program code for selecting the choice of symbol boundary timing with the least noise due to inter-carrier and inter-symbol interference.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques for acquiring symbol boundary timing at a receiver of a multicarrier data transmission system during a training sequence. One aspect is symbol boundary determination at a receiver wherein minimal interference is used as a criterion in selecting from a plurality of potential symbol boundary timings. The symbol boundary determination at the receiver can be performed in a time domain or a frequency domain manner. Another aspect pertains to an improved training sequence wherein pairs of identical symbols are transmitted by a transmitter. These symbols can be supplied to the transmitter in a time domain or a frequency domain manner. Different embodiments of the invention can incorporate one or more of these aspects.

Embodiments of the invention are discussed below with reference to FIGS. 1-14. However, those skilled in the art will readily appreciate that the detailed description given herein with respect to these figures is for explanatory purposes as the invention extends beyond these limited embodiments.

Figure 1:
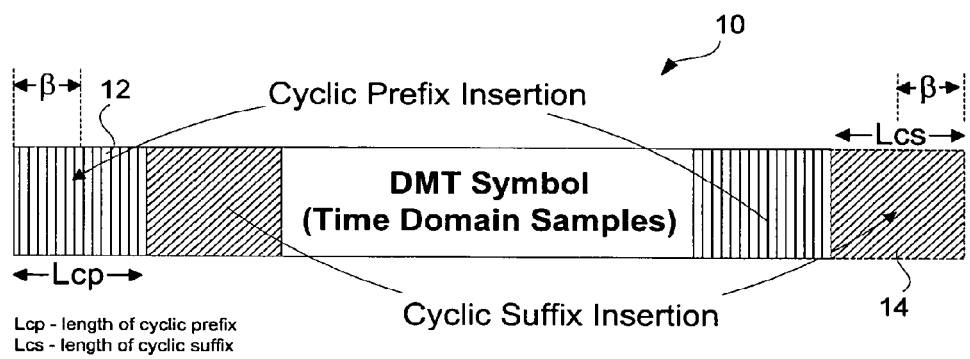
FIG. 1 is a diagram illustrating a representative, conventional DMT symbol having a cyclic prefix and a cyclic suffix.
Figure 2A:
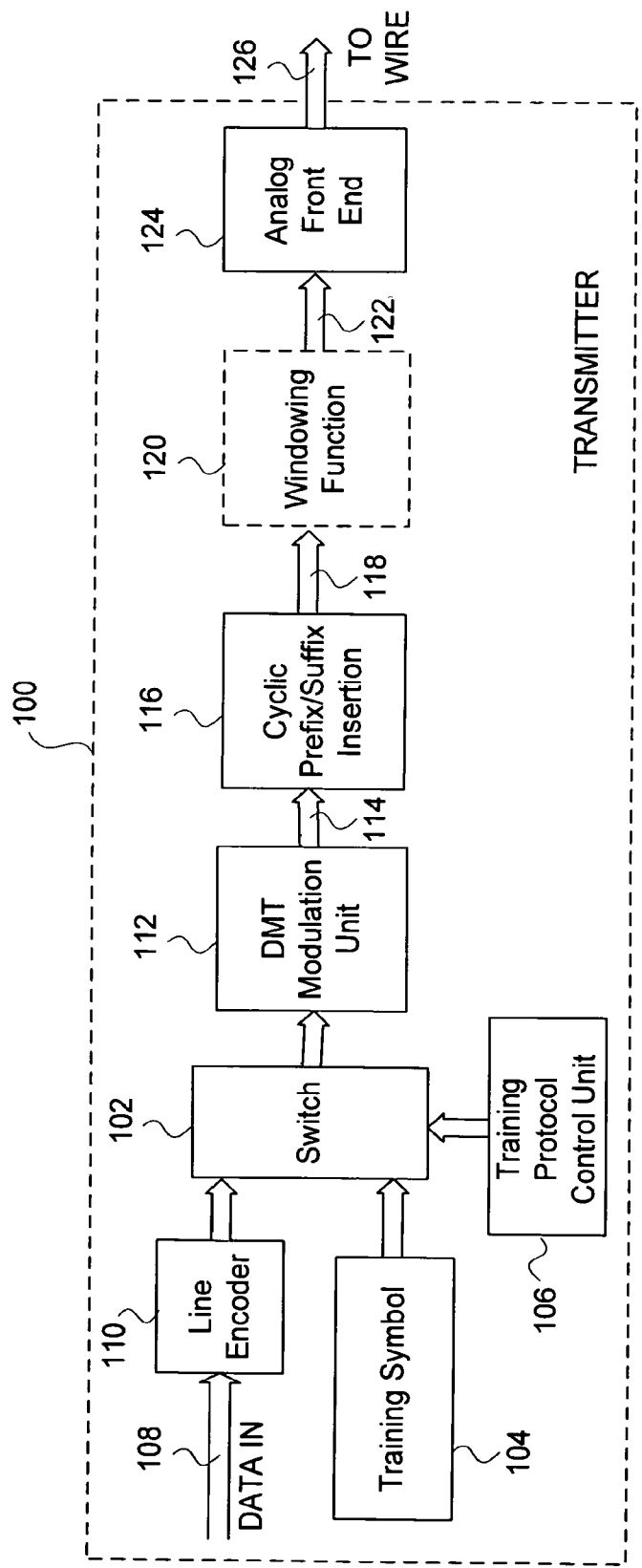
FIG. 2A is a block diagram of a transmitter according to one embodiment of the invention.

FIG. 2A is a block diagram of a transmitter 100 according to one embodiment of the invention. The transmitter 100 is, for example, associated with a multicarrier data transmission system.

The transmitter 100 includes a switch 102. The switch 102 can provide one data path in a data transmission mode and another data path in a training mode. When the switch 102 is set to the training mode, training symbols 104 are supplied to the switch 102. In addition, a training protocol control unit 106 can interact with the switch 102 so as to control the manner by which the training symbols 104 are transmitted. In one implementation, the training protocol control unit 106 controls the switch 102 such that the training symbols 104 are transmitted so that pairs of identical training symbols are transmitted. In one example, each pair of identical training symbols being transmitted can be consecutive.

On the other hand, when the switch 102 is in the data transmission mode, data 108 to be transmitted is supplied to a line encoder 110. The line encoder encodes the data 108 into symbols which are then supplied to the switch 102. For example, the symbols can be Quadrature Amplitude Modulated (QAM) symbols.

The switch 102 outputs the appropriate symbols, i.e., data transmission symbols or training symbols. The symbols output from the switch 102 are supplied to a Discrete Multi-Tone (DMT) modulation unit 112 that converts the symbols into DMT symbols 114. For example, the DMT modulation unit 112 can be an Inverse Fast Fourier Transform (IFFT) circuit. The DMT symbols 114 are supplied to a cyclic prefix/suffix insertion unit 116. The cyclic prefix/suffix insertion unit inserts a cyclic prefix and/or a cyclic suffix to the DMT symbols 114. The cyclic prefix and/or cyclic suffix is used to maintain the circularity of DMT symbol. The outputs of the cyclic prefix insertion unit 116 are enhanced symbols 118. The transmitter 100 optionally includes a windowing function 120. The windowing function 120 can be imposed on the enhanced symbols 118 to produce modified symbols 122. The windowing function 120 can further reduce interference by reducing the magnitude of the sidelobes at the receiver, and/or by reducing out-of-band energy at a transmitter. The modified symbols are then supplied to an analog front end 124 which converts the modified symbols 122 from a digital form into an analog form and thus outputs analog signals 126 to a wire where they are transmitted to one or more receivers. The analog front end, for example, includes one or more line drivers, filters and digital-to-analog converters.

Figure 2B:
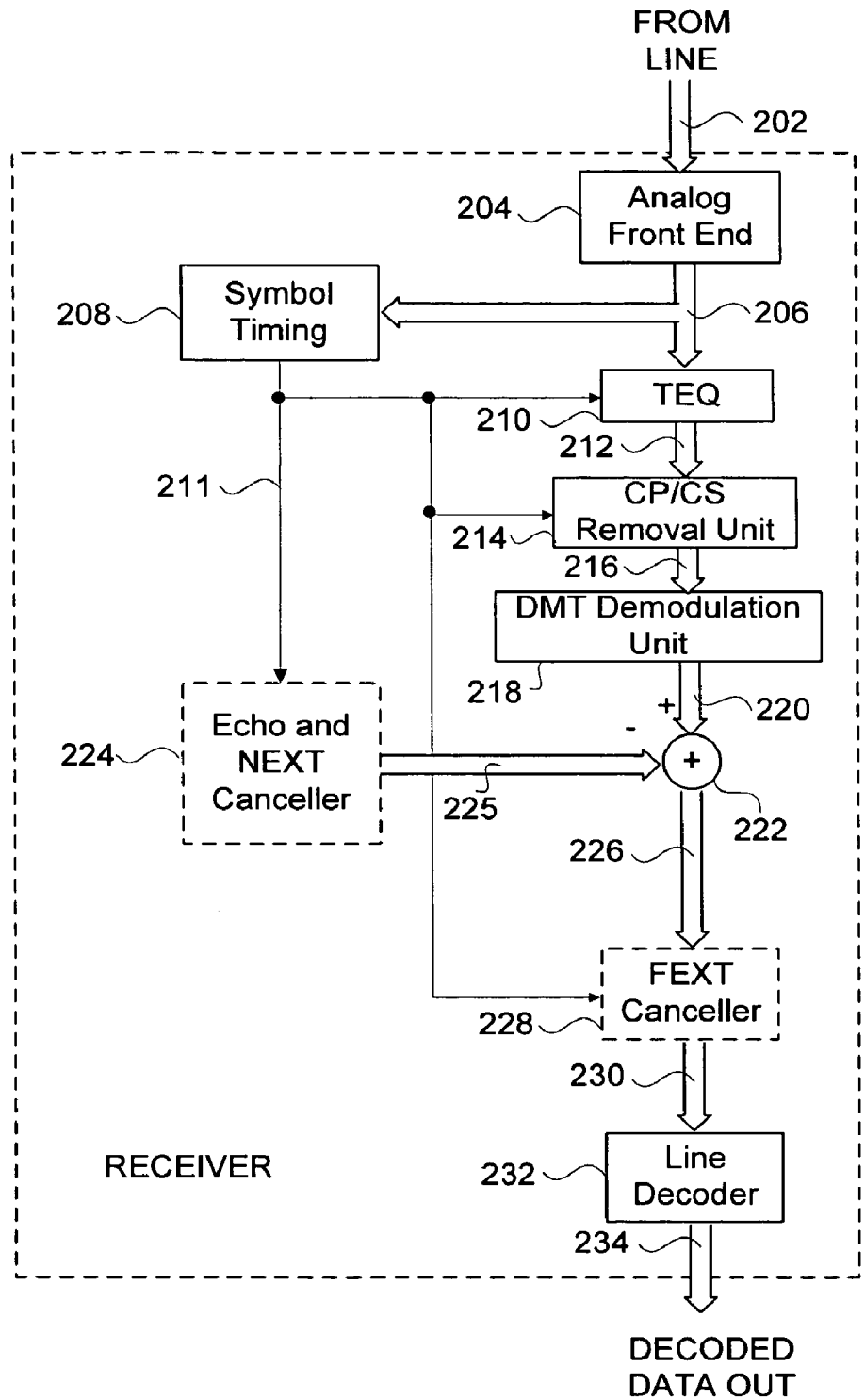
FIG. 2B is a block diagram of a receiver according to one embodiment of the invention.

FIG. 2B is a block diagram of a receiver 200 according to one embodiment of the invention. The receiver 200 is, for example, associated with a multicarrier data transmission system. The receiver 200 is suitable for receiving data transmitted by the transmitter 100 illustrated in FIG. 2A.

The receiver 200 receives incoming analog signals 202 from a line. For example, the incoming analog signals 202 may have been transmitted to the receiver 200 over the line by the transmitter 100 illustrated in FIG. 2A. The incoming analog signals 202 being received are supplied to an analog front end 204. The analog front end produces digital samples 206. The analog front end 204 typically includes one or more of: amplifiers, filters and analog-to-digital converters. The digital samples 206, for example, pertain to DMT samples.

The digital samples 206 are supplied to a symbol timing unit 208. The symbol timing unit 208 examines the digital samples 206 and determines an appropriate symbol boundary for recovery of the transmitted data. In one embodiment, the symbol timing unit 208 determines the appropriate symbol boundary timing based on interference values at different possible symbol boundaries. For example, those of the possible symbol boundaries having the lowest interference values would be the desirable choices for the appropriate symbol boundary timing. Once the appropriate symbol boundary timing has been determined, the symbol timing unit 208 can provide control signals 211 to various other components within the receiver 200 so as to synchronize the data recovery with the symbol timing boundaries. The symbol timing unit 208 will operate during a training sequence or training mode in which the corresponding transmitter (e.g., the transmitter 100 shown in FIG. 2A) transmits training symbols (e.g., training symbols 104) to the receiver 200.

The digital samples 206 are also supplied to a Time domain EQualizer (TEQ) 210. The time domain equalizer 210 outputs enhanced symbols 212 that are supplied to a cyclic prefix removal unit 214. The TEQ 210 shortens the effective channel spread so that the effective channel (actual channel +TEQ) has a spread that is shorter than the cyclic prefix (and/or cyclic suffix). The cyclic prefix/suffix removal unit 214 removes any cyclic prefix and/or cyclic suffix that may be attached to the enhanced symbol 212 and could optionally provide receiver windowing. The cyclic prefix removal unit 214 outputs DMT symbols 216. A DMT demodulation unit 218 receives the DMT symbols 216 and outputs Quadrature Amplitude Modulated (QAM) symbols 220. The QAM symbols 220 result from a demodulation of the DMT symbols 216. In one implementation, the DMT demodulation unit 218 can include a Fast Fourier Transform (FFT).

The QAM symbols 220 can further be modified to reduce interference due to nearby or far away sources. For example, the receiver 200 can optionally include an adder 222 and an echo and NEXT canceller 224. The adder 222 receives a next estimate 225 from the echo and NEXT canceller 224. The adder 222 subtracts the next estimate 225 from the QAM symbols 220 to produce modified QAM symbols 226. Furthermore, the receiver 200 can optionally include a FEXT canceller 228. The modified QAM symbols 226 can be supplied to the FEXT canceller 228 so that far away interference can be cancelled from the modified QAM symbols 226. The output of the FEXT canceller 228 are modified QAM symbols 230. Finally, a line decoder 232 can decode the modified QAM symbols 230 into decoded data 234 that is output from the receiver 200. The output from the receiver 200 should be the digital data that was originally transmitted to the receiver 200.

The invention is particularly concerned with transmitting training symbols from a transmitter, and then determining a symbol boundary timing at a receiver in accordance with information gathered using the received training symbols at the receiver. The receiver is not required to have any knowledge of the training symbols or a sequence thereof.

Figure 3A:
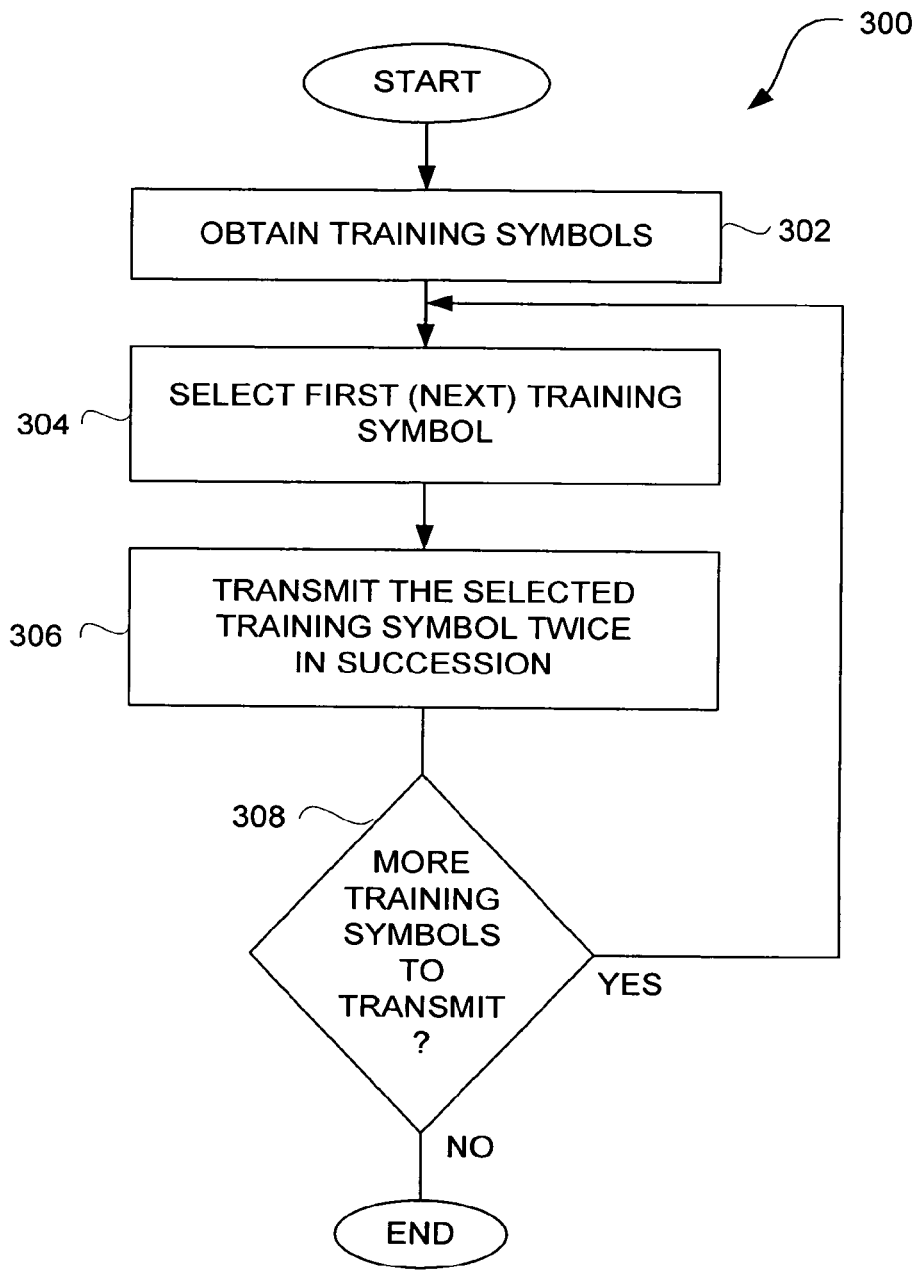
FIG. 3A is a flow diagram of a training sequence process according to one embodiment of the invention.

FIG. 3A is a flow diagram of a training sequence process 300 according to one embodiment of the invention. The training sequence process 300 initially obtains 302 training symbols. The training symbols are symbols (e.g., QAM symbols) that are to be transmitted using multicarrier modulation techniques to one or more receivers in order to permit the one or more receivers to acquire the symbol boundary timing needed to properly decode the data that is to be transmitted to the one or more receivers.

The training symbols can be obtained 302 in a number of different ways. For example, in one embodiment, the training symbols can be obtained 302 by generating the training symbols. Typically, the training symbols are produced in a pseudo-random manner. In one embodiment, the training symbols can be generated by a pseudo-random generator. In another embodiment, the training symbols can be pre-stored in memory (e.g., a look-up table) and then obtained 302 by reading the appropriate training symbols from the memory.

After the training symbols have been obtained 302, a first training symbol is selected 304. The selected training symbol is then transmitted 306 twice in succession. Next, a decision 308 determines whether there are more training symbols to be transmitted. The number of training symbols can be configurable by manufacturers or users, depending on the needs of specific applications. In any case, when the decision 308 determines that more training symbols are to be transmitted, the training sequence process 300 returns to repeat the block 304 so that a next training symbol can be selected and then subsequently transmitted 306 twice in succession. Hence, the various training symbols typically represent a series of training symbols that are to be transmitted. In this embodiment, the training symbols are transmitted so that each symbol in the series is transmitted twice in succession. In any case, when the decision 308 determines that there are no more training symbols to be transmitted, the training sequence process 300 is complete and ends.

In practice, the training sequence described by FIG. 3A is an efficient embodiment of a training sequence process according to the invention. However, the training sequence process can be generalized so that training symbols are transmitted 306 one or more times. For example, besides transmitting training symbols twice in succession, the training symbols could be transmitted once or three times or more in succession.

Figure 3B:
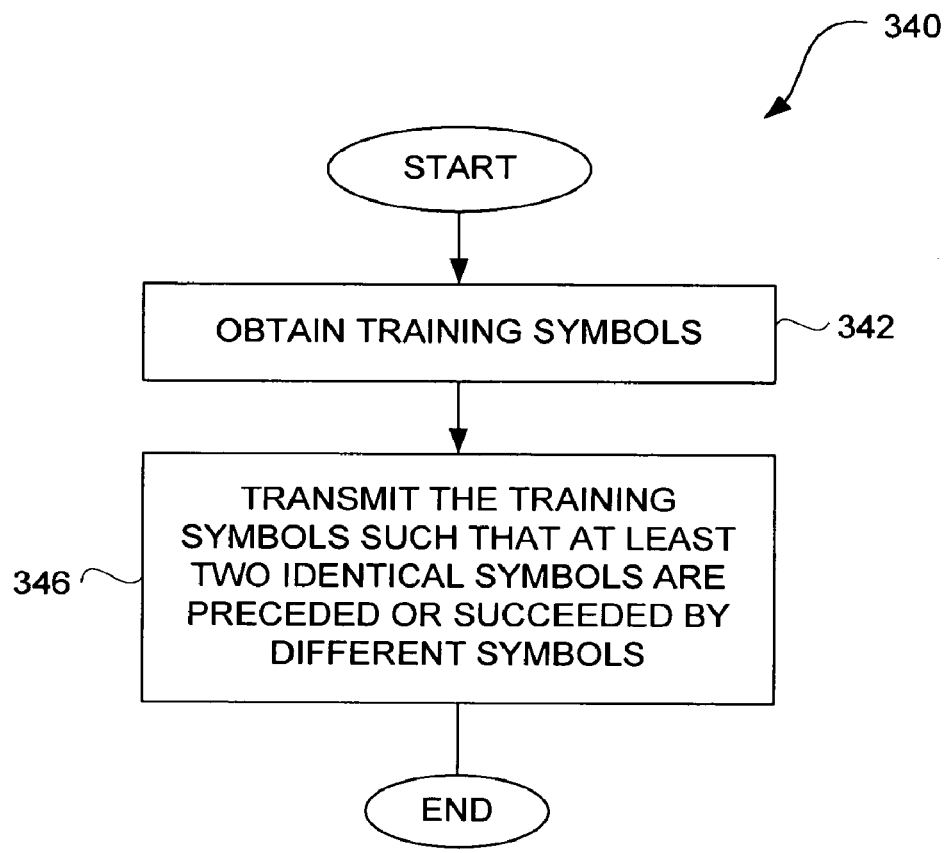
FIG. 3B is a flow diagram of a training sequence process according to another embodiment of the invention.

FIG. 3B is a flow diagram of a training sequence process 340 according to another embodiment of the invention. The training sequence process 340 initially obtains 342 training symbols. The training symbols are symbols that are to be transmitted to one or more receivers in order to permit the one or more receivers to acquire the symbol boundary timing needed to properly decode the data that is to be transmitted to the one or more receivers. Typically, the training symbols are transmitted using multicarrier modulation techniques to the one or more receivers. As previously noted, the training symbols can be obtained 342 in a number of different ways. After the training symbols have been obtained 342, the training symbols are transmitted 344 to the one or more receivers. The manner in which the training symbols are transmitted is such that at least two identical symbols are preceded or succeeded by different symbols.

Figure 3C:
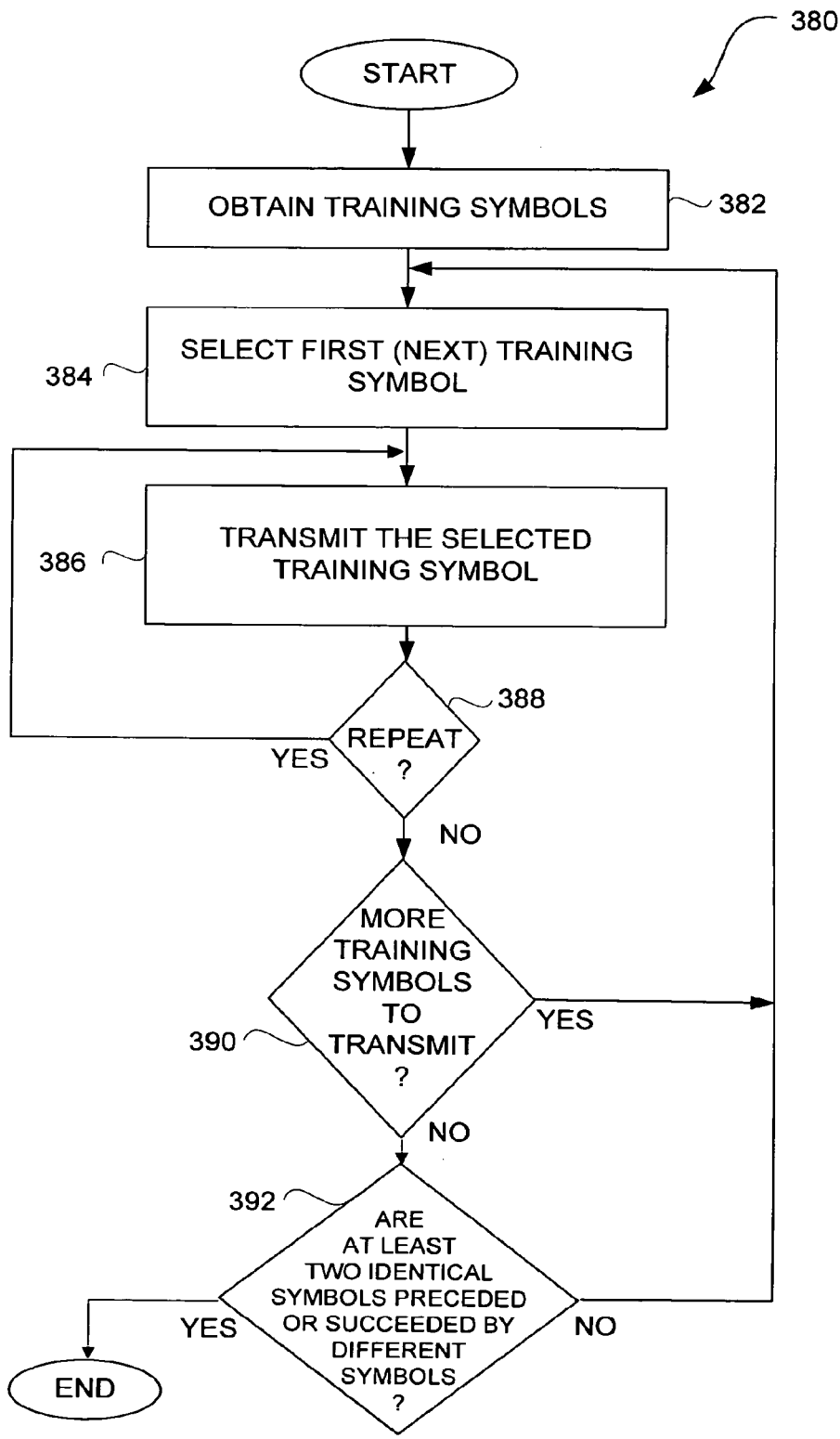
FIG. 3C is a flow diagram of a training sequence process according to still another embodiment of the invention.

FIG. 3C is a flow diagram of a training sequence process 380 according to still another embodiment of the invention. The training sequence process 380 represents, like the training sequence process 300, represent embodiments of the training sequence process 340. The training sequence process 380 also represents a generalization of the training sequence process 300 in that training symbols can be repeated zero or more time during transmission.

The training sequence process 380 initially obtains 382 training symbols. The training symbols are symbols that are to be transmitted to one or more receivers in order to permit the one or more receivers to acquire the symbol boundary timing needed to properly decode the data that is to be transmitted to the one or more receivers. Typically, the training symbols are transmitted using multicarrier modulation techniques to the one or more receivers. As previously noted, the training symbols can be obtained 382 in a number of different ways. The training symbols may or may not be distinct from one another. After the training symbols have been obtained 382, a first training symbol is selected 384. The selected training symbol is then transmitted 386. A decision 388 then determines whether the selected training symbol is to be repeated. When the selected training symbol is to be repeated, the selected training symbol is again transmitted 386. Next, a decision 390 determines whether there are more training symbols to be transmitted. The number of training symbols can be configurable by manufacturers or users, depending on the needs of specific applications. In any case, when the decision 392 determines that more training symbols are to be transmitted, the training sequence process 380 returns to repeat the block 384 so that a next training symbol can be selected and then subsequently transmitted 386, 390 one or more times. Hence, the various training symbols typically represent a series of training symbols that are to be transmitted. In this embodiment, the training symbols are transmitted so that each symbol in the series is transmitted one or more times in succession. In any case, when the decision 392 determines that there are no more training symbols to be transmitted, a decision 392 determines whether at least two identical symbols have been preceded or succeeded by different symbols in the course of the transmission 386 of the series of training symbols. When the decision 392 indicates that no two identical symbols have been preceded or succeeded by different symbols, the training sequence process 380 returns to repeat the block 384 so that the processing can continue so that this condition can be satisfied. On the other hand, when the decision 392 indicates that at least two identical symbols have been preceded or succeeded by different symbols, the training sequence process 380 is complete and ends.

The particular transmission sequence of training symbols by various embodiment of the training sequence process 300, 340 and 380 can vary. A first example is the transmission sequence "A, A, B, B, C, C, D, D" which allows symbols A, B, C and D to all be used in acquiring symbol boundary timing. The training sequence process 300 of FIG. 3A is designed to use such an efficient approach. The training sequence processes 340 and 380 of FIGS. 3B and 3C are also able to utilize the transmission sequence of the first example as well as many others, such as exemplified by the following examples. A second example is the transmission sequence "A, B, B, C, D, E, E, F, F, F, C, G" which allows symbols B, C, E and F to be used in acquiring symbol boundary timing. A third example is the transmission sequence "A, B, C, D, E, B, F" which allows symbol B to be used in acquiring symbol boundary timing. A fourth example is the transmission sequence "A, B, C, B, C, D" which allows symbols B and C to be used in acquiring symbol boundary timing. A fifth example is the transmission sequence "A, B, D, E, B, D, F" which allows symbols B and D to be used in acquiring symbol boundary timing. To the extent that a transmission sequence uses symbols that cannot be used in acquiring symbol boundary timing, such symbols increase the latency to acquire symbol boundary timing, thus are less efficient. However, in some cases, the symbols being transmitted but not used to acquire symbol boundary timing can be used for other purposes. It should be understood that these exemplary transmission sequences are abbreviated for ease of illustration, as typically training sequences will be substantially longer (e.g., 500 usable symbol pairs)

Figure 4:
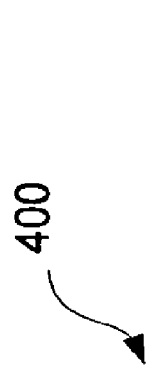
FIG. 4 is a diagram of an initial portion of a representative training sequence according to one embodiment of the invention.

FIG. 4 is a diagram of an initial portion of a representative training sequence 400 according to one embodiment of the invention. As shown in FIG. 4, the training sequence 400 has an initial portion that illustrates the first six symbols to be transmitted. Note that the first and second symbols that are transmitted are both symbol A, that the third and fourth symbols transmitted are both symbol B, and that the fifth and sixth symbols transmitted are both symbol C. In other words, each symbol of the training sequence 400 is sent twice, one after the other. The training sequence process 300 can be used to produce the training sequence 400. The advantages of this particular type of training sequence and transmission of such training symbols is explained in more detail below.

Figure 5A:
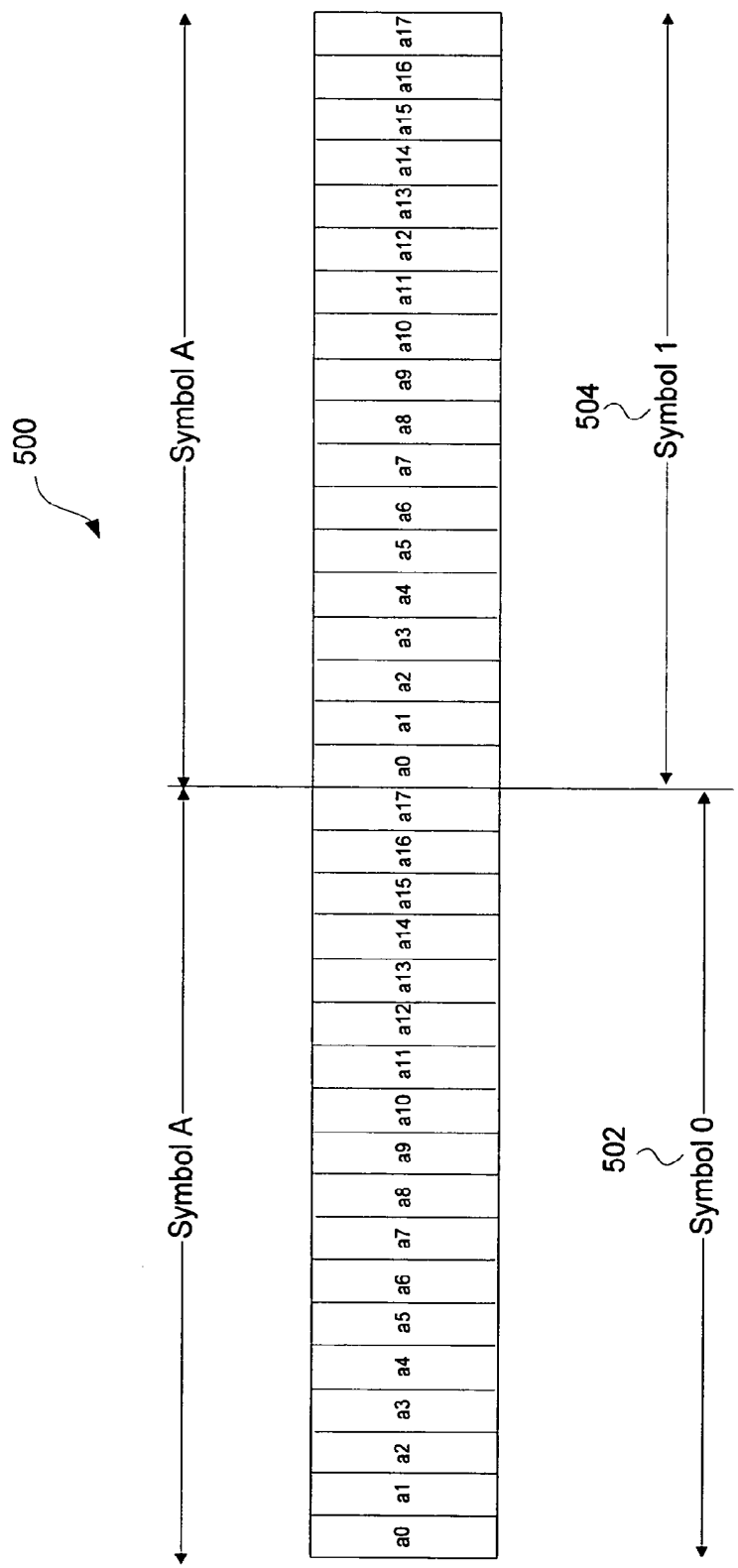
FIGS. 5A-5C illustrate representative pairs of identical symbols that can be utilized according to different embodiments of the invention.
Figure 5B:
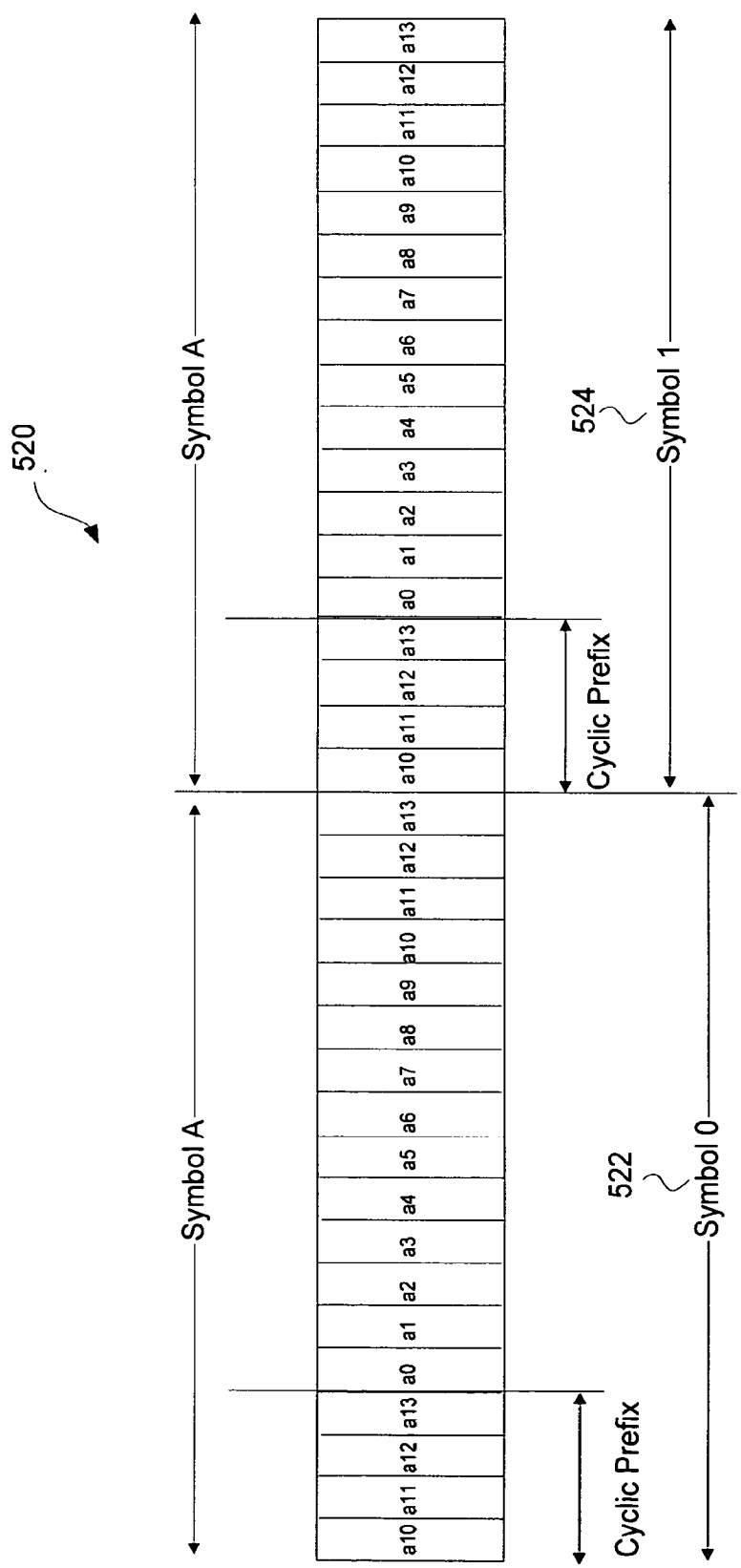
Figure 5C:
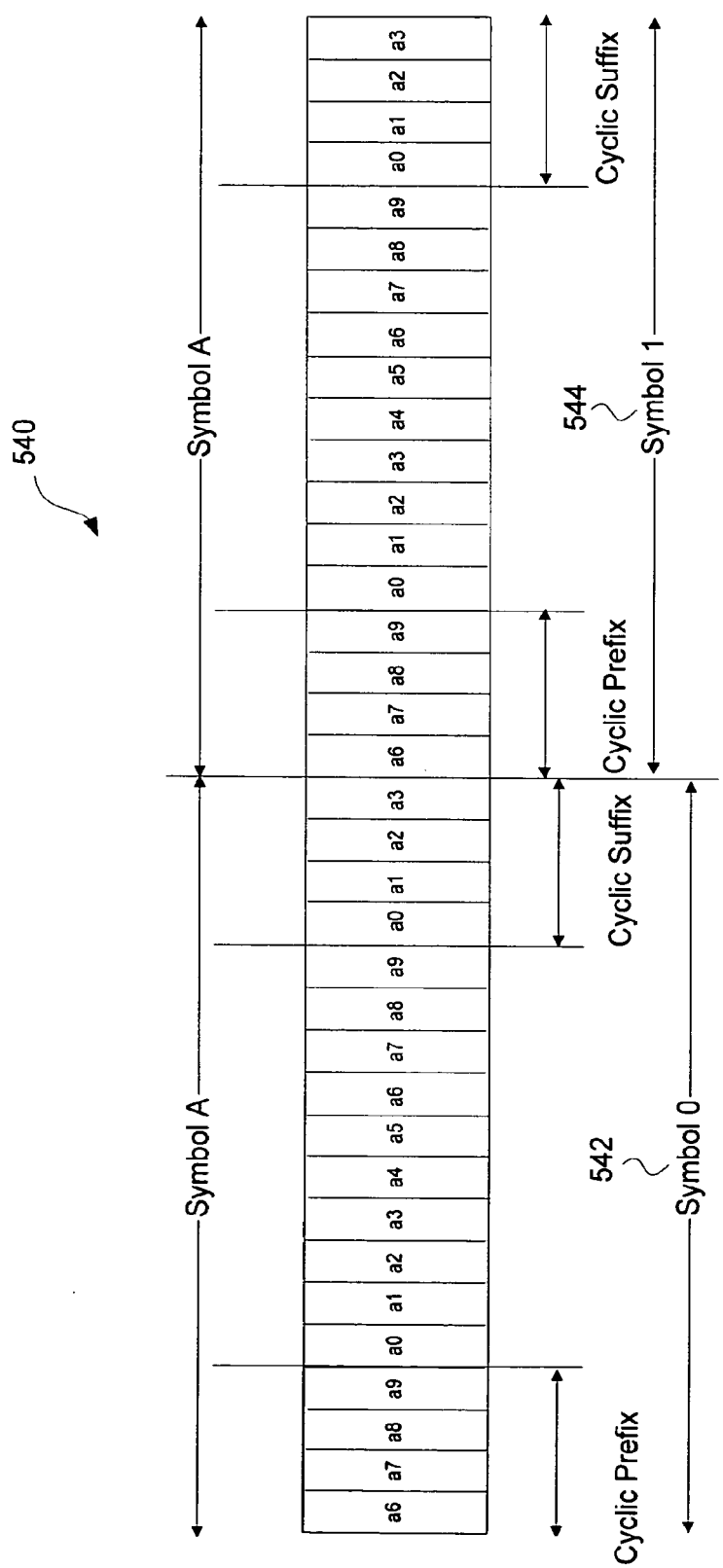

FIGS. 5A-5C illustrate representative pairs of identical symbols that can be utilized according to different embodiments of the invention. FIG. 5A illustrates a pair of identical symbols 500 according to one embodiment of the invention. The pair of identical symbols include symbol-0 502 and symbol-1 504. The symbol-0 502 is initially transmitted and then immediately followed by the transmission of symbol-1 504. Both the symbol-0 502 and the symbol-1 504 pertain to the transmission of symbol A. Hence, the symbol-0 502 and the symbol-1 504 can represent a pair of identical symbols. The symbol A includes a plurality of samples A0-A17 which represent data values transmitted on each of a plurality of subcarriers utilized by the multicarrier data transmission system. The sample numbers used in FIGS. 5A-5C (i.e., A0-A17, A0-A13, A0-A9) are all for illustration purposes and vary for different applications.

FIG. 5B illustrates a pair of identical symbols 520 according to another embodiment of the invention. The pair of identical symbols includes a symbol-0 522 and a symbol-1 524. The symbol-0 522 is initially transmitted and then immediately followed by the transmission of symbol-1 524. Each of the symbols 522 and 524 pertain to the transmission of symbol A. In this embodiment, the symbol A includes samples A0-A13 which carry data values and a cyclic prefix associated with samples A10-A13. The length of the cyclic prefix can correspond to more or less than four samples as shown in FIG. 5B. Similarly, the number of samples A0-A13 for the symbol A can also vary depending upon implementation. For example, if the multicarrier data transmission system were an ADSL system, then the symbol might include a total of 512 samples.

FIG. 5C illustrates a pair of identical symbols 540 according to yet another embodiment of the invention. In this embodiment, the symbols include both a cyclic prefix and a cyclic suffix. The pair of identical symbols 540 include symbol-0 542 and symbol-1 544. The symbol-0 542 and the symbol-1 544 both pertain to the transmission of symbol A. In this embodiment, the symbol A includes samples A0-A9 which carry data values, a cyclic prefix associated with samples A6-A9, and a cyclic suffix associated with samples A0-A3.

It should be recognized, as noted above, that it is not necessary that two identical symbols be transmitted in succession. So long as the two identical symbols are preceded or succeeded by different symbols and the receiver understands the manner by which the identical symbols will be transmitted, the receiver can analyze the pairs of identical symbols as received. It should also be noted that for a more robust estimation of symbol boundary timing, both the criteria of preceded and succeeded by different symbols should be fulfilled. For example, the different symbols A, B, C and D can be transmitted as consecutive pairs (e.g., A, A, B, B, C, C, D, D). Even more general, a training sequence consists of two or more identical symbols where each contributing symbol is preceded or succeeded by different symbols. For example, the symbols B, C, E, and F are all valid training symbols in the following transmitted training sequence: A, B, B, C, D, E, E, F, F, F, C, G. Note that in these examples, the identical symbols are preceded or succeeded by different symbols. Throughout the application, the example of using uniform consecutive pairs (namely: A, A, B, B, C, C, D, D) is often assumed, the extension of the description to the general case is implicit in this application.

Figure 6:
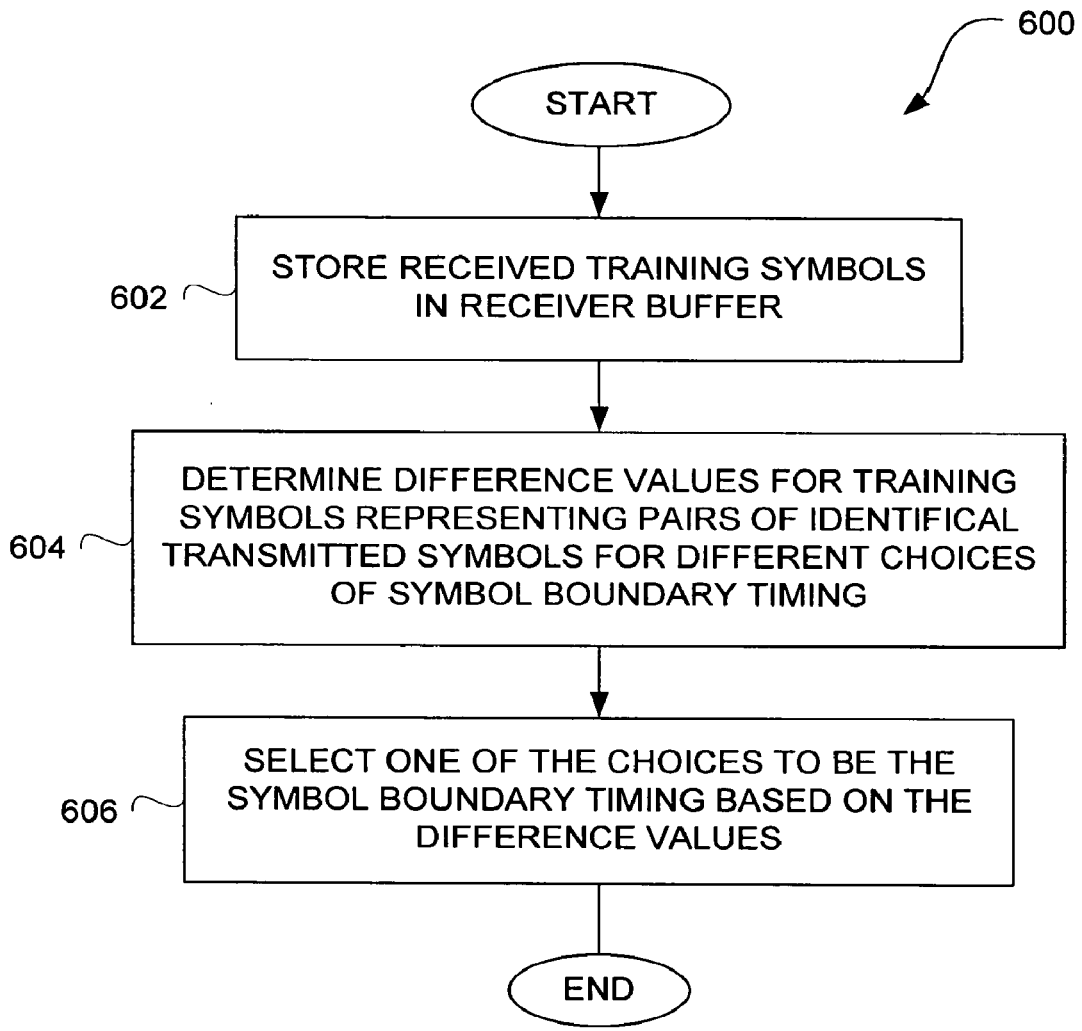
FIG. 6 is a flow diagram of a symbol boundary determination process according to one embodiment of the invention.

FIG. 6 is a flow diagram of a symbol boundary determination process 600 according to one embodiment of the invention. The symbol boundary determination process 600 stores 602 received training symbols in a receiver buffer. Then, the sample values of the received training symbols stored 602 in the receiver buffer (which represent pairs of identical transmitted symbols) are processed to determine 604 difference values for a plurality of different choices of symbol boundary timing. Then, one of the choices is selected 606 to be the symbol boundary timing based on the difference values. The difference values are associated with a pair of received training symbols that were identical on transmission. The difference values for such a pair of received training symbols provide an indication of interference. The interference, for example, pertains to inter-carrier or inter-symbol interference. In other words, the difference values can represent estimated noise due to inter-carrier and inter-symbol interference. If the symbols preceding the identical pair of symbols are different, interference due to the preceding symbol is obtained. On the other hand, if the symbols succeeding the identical pair of symbols are different, interference due to the succeeding symbol is obtained. Hence, the selection 606 of one of the choices to be the symbol boundary timing can be biased towards the difference values that are the lowest. The lower the difference value, the less interference is present using that symbol boundary timing. Consequently, the performance of the multi-carrier data transmission system can be improved when the symbol timing boundary is chosen in view of interference levels.

Although the symbol boundary determination process 600 makes reference to a pair of received training symbols, the difference values being utilized to select the symbol boundary timing can be accumulated or averaged over a number of pairs of symbols.

Figure 7A:
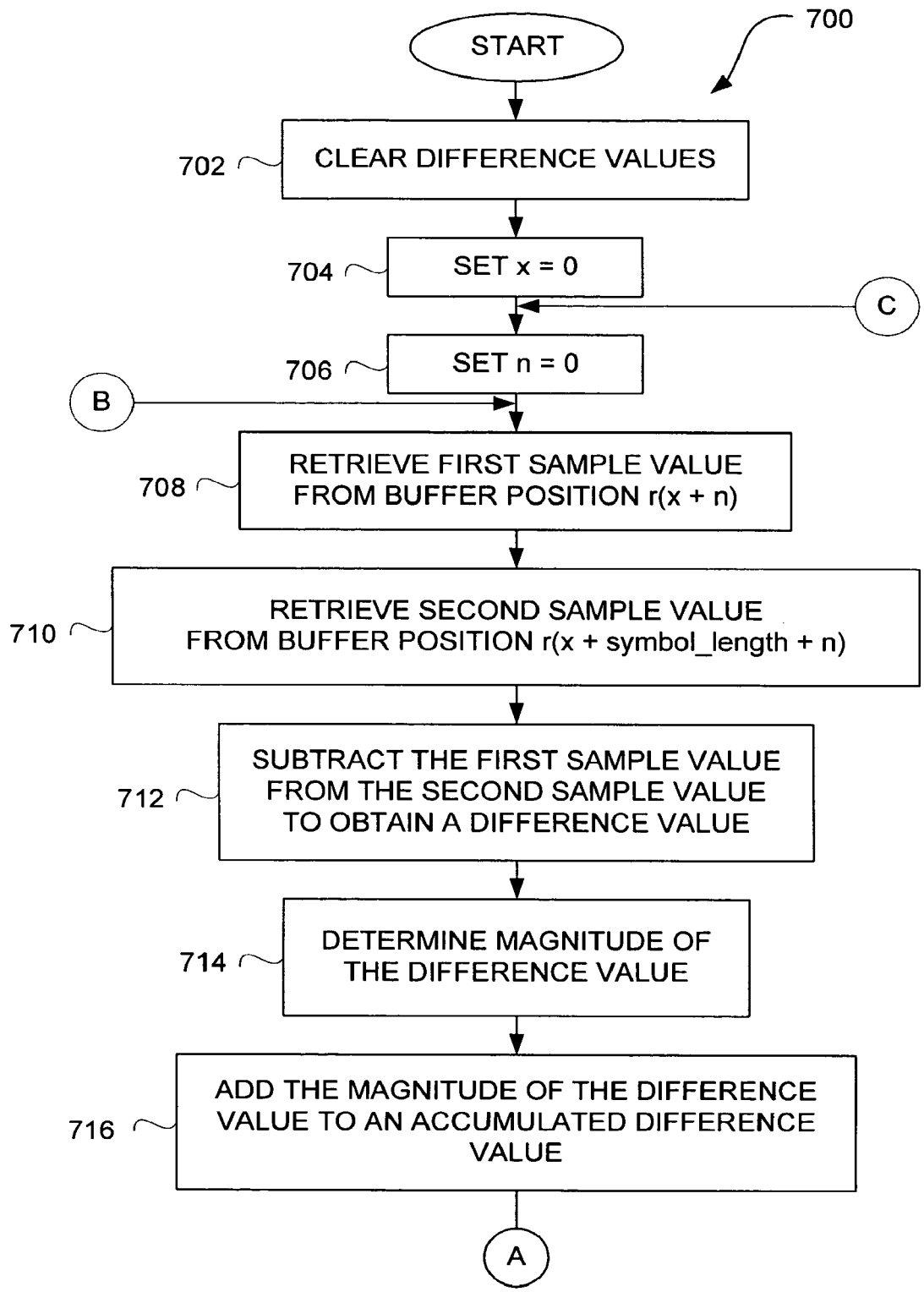
FIGS. 7A-7B are flow diagrams of a symbol boundary determination process according to another embodiment of the invention.
Figure 7B:
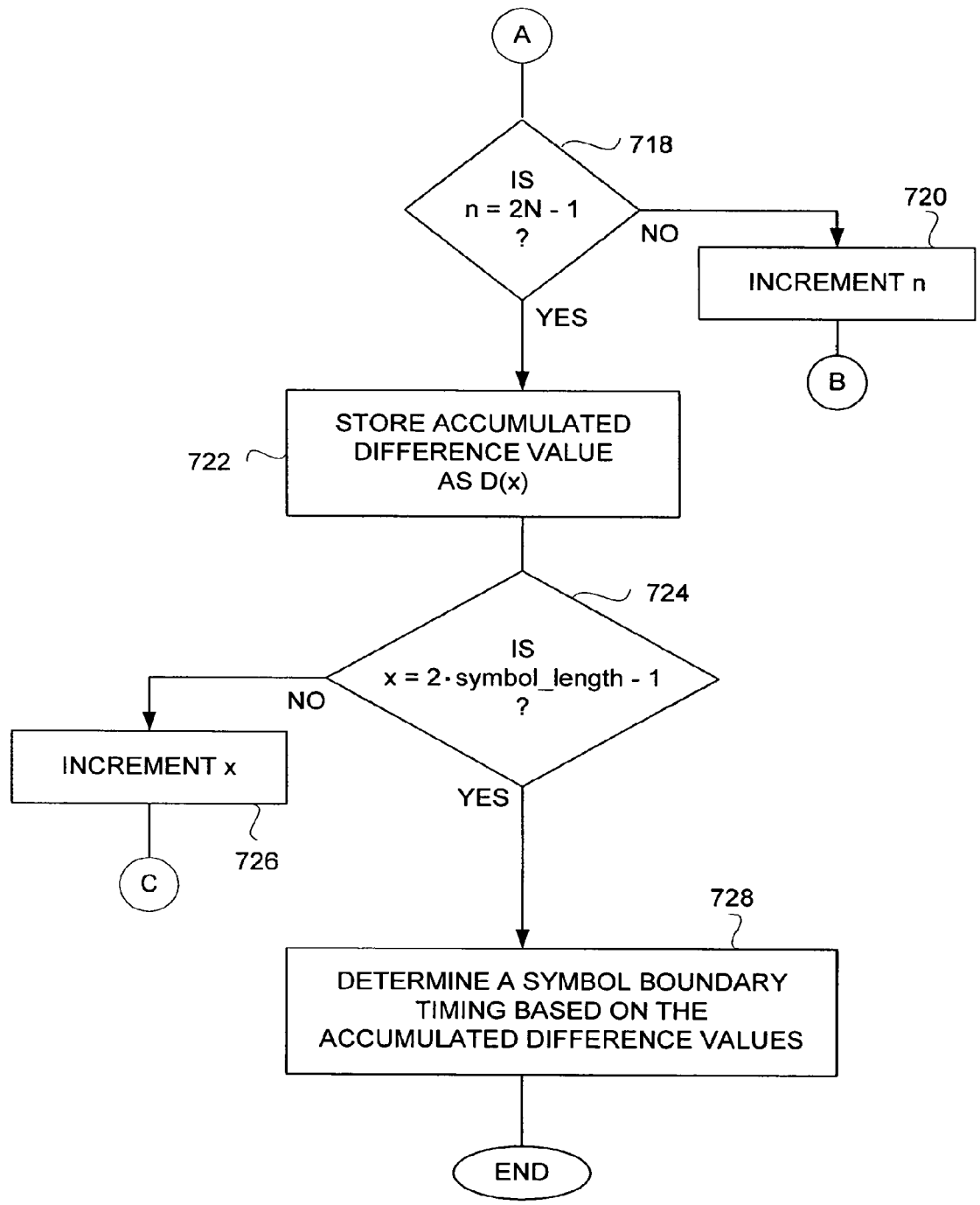

FIGS. 7A-7B are flow diagrams of a symbol boundary determination process 700 according to another embodiment of the invention. The symbol boundary determination process 700 is, for example, performed by a receiver of a multicarrier data transmission system. As an example, the symbol timing unit 208 within the receiver 200 illustrated in FIG. 2B can perform the symbol boundary determination process 700.

The symbol boundary determination process 700 initially clears 702 any difference values (including any accumulated difference values) and sets 704 variable x to zero (0). In addition, the variable n is set 706 to zero (0). Here, the operations 702-706 are used to initialize the system for the symbol boundary determination process.

Once the system has been initialized, a first sample value is retrieved 708 from buffer position r(x+n). Here, the buffer position (r) pertains to a position (x+n) within a receive buffer that holds a series of incoming analog signals that were transmitted from a transmitter in accordance with a training protocol. A second sample value is retrieved 710 from buffer position r(x+symbol_length+1), where symbol_length represents the length of the symbols being transmitted to the receiver. Then, the first sample value is subtracted 712 from the second sample value to obtain a difference value. Typically, for ease of implementation, the subtraction 712 operation is implemented as an addition (e.g., using two's complement values). Next, the magnitude of the difference value is determined 714. For example, the magnitude can be determined by the absolute value of the difference value. Alternatively, another mathematical operation such as magnitude square can be determined for the difference value and used in place of the magnitude. The magnitude of the difference value is then added 716 to an accumulated difference value. The difference values are accumulated over a plurality of different n values.

Next, a decision 718 determines whether the variable n=2N−1. Here, N represents the number of subcarriers (e.g., tones) within a symbol. It should also be noted that the value of 2N−1 would be different in other embodiments, such as embodiments that utilize a cyclic prefix or suffix. In any case, when the decision 718 determines that the variable n does not=2N−1, then the variable n is incremented 720. After the variable n is incremented 720, the symbol boundary determination process 700 returns to repeat the operation 708 and subsequent operations so that another difference value can be obtained and accumulated for the current buffer offset specified by the variable x. On the other hand, when the decision 718 determines that the variable n=2N−1, then all the difference values have been accumulated within the accumulated difference value for the current buffer offset identified by the variable x. Accordingly, the accumulated difference value, represented as D(x), is stored 722.

Next, a decision 724 determines whether the variable x=2*symbol_length−1. Here, the decision 724 determines whether the offset into the receive buffer has traversed a symbol length. When the decision 724 determines that the buffer offset has not traversed a symbol length, the symbol x is incremented 726. Following the operation 726, the symbol boundary determination process 700 returns to repeat the operation 706 and subsequent operations so that an accumulated difference value can be acquired for the next offset into the receive buffer.

When the decision 724 determines that the variable x=2·symbol_length−1, then the accumulated difference values have been obtained for two symbol lengths. Hence, a symbol boundary timing can then be determined 728 based on the accumulated difference values (D(x)). Here, the symbol boundary timing can be determined 728 based on the offset (or timing index) with respect to the receive buffer that offers the lowest accumulated difference value. The search space over which the lowest accumulated difference value is found is equal to a length of two symbols. In the event that there are multiple accumulated difference values that are equally low, the difference value offering either the shortest or the longest offset into the receive buffer can be chosen, depending on the respective training sequence. Following the operation 728, the symbol boundary timing has been determined and thus the symbol boundary determination process 700 is complete and ends. However, it should be noted that the symbol boundary determination process 700 can be performed multiple times for different pairs of first and second sample value sets from the receive buffer and to accumulate or average such values a plurality of times. In such case, the symbol boundary timing can be based on the accumulation or average of the various accumulated difference values.

If the pairs of identical symbols in the training sequence are preceded by the same symbols, there could be multiple accumulated difference values that are equally low. Since the inter-symbol interference due to the preceding symbols is not taken into account with such a training sequence, the longest offset into the receive buffer can be chosen in order to minimize the possible introduction of inter-symbol interference due to the preceding symbols.

If the pairs of identical symbols in the training sequence are succeeded by the same symbols, there could be multiple accumulated difference values that are equally low. Since the inter-symbol interference due to the succeeding symbols is not taken into account with such a training sequence, the shortest offset into the receive buffer can be chosen in order to minimize the possible introduction of inter-symbol interference due to the succeeding symbols.

In other cases, the shortest offset into the receive buffer should be chosen as the received symbol boundary.

It should also be noted that, if the chosen offset into the receive buffer is longer than the length of a symbol (symbol_length), the length of a symbol (symbol_length) can be subtracted from the chosen offset to give the received symbol boundary to improve latency.

Figure 8:
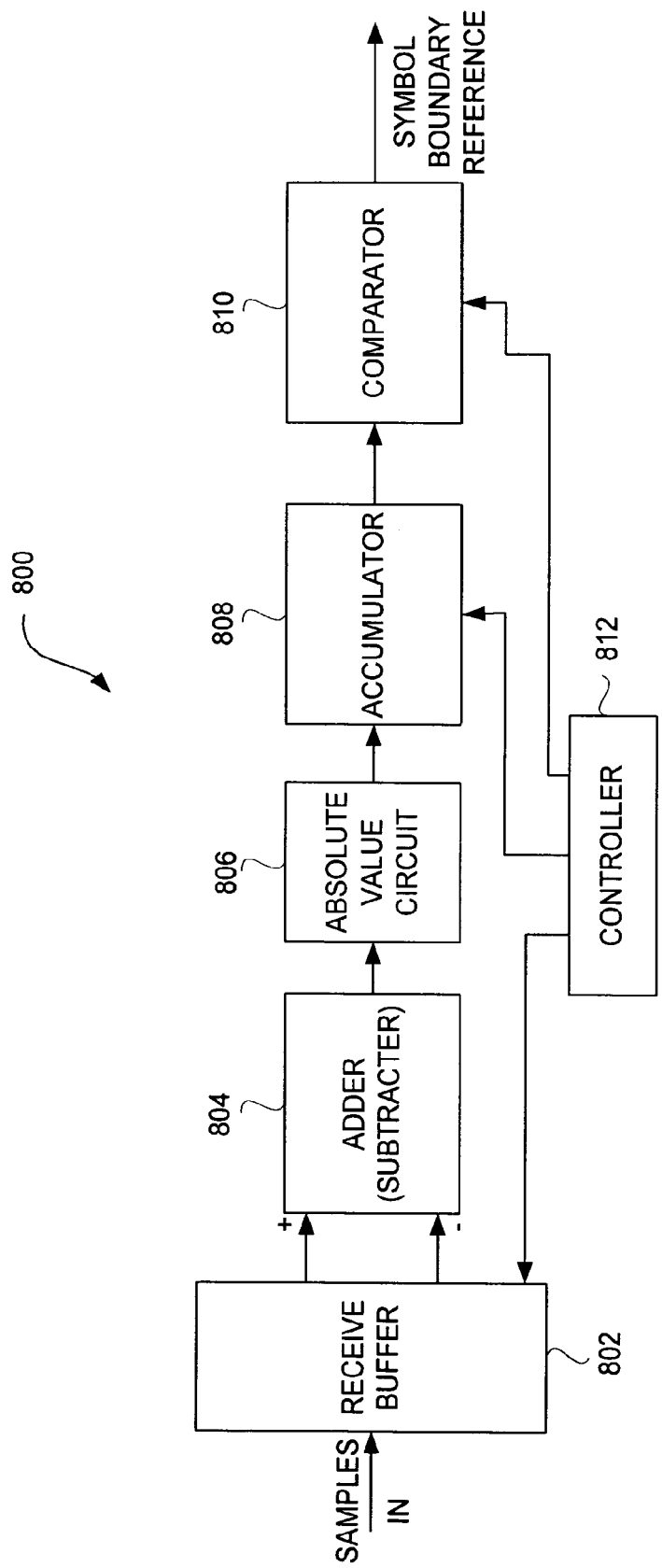
FIG. 8 is a block diagram of a symbol boundary timing unit according to one embodiment of the invention.

FIG. 8 is a block diagram of a symbol boundary timing unit 800 according to one embodiment of the invention. The symbol boundary timing unit 800 operates to determine a symbol boundary reference that is utilized by a receiver. For example, in accordance with one embodiment, the symbol boundary timing unit 800 can be utilized as the symbol timing unit 208 illustrated in FIG. 2B.

The symbol boundary timing unit 800 receives incoming samples at a receive buffer 802. The incoming samples are analog signals from a wire. The receive buffer stores the samples and has enough capacity to store four entire symbols. An adder 804 performs a subtraction operation with respect to two different samples residing within the receive buffer 802. In one embodiment, the separation of the samples being supplied to the adder 804 with respect to the receive buffer 802 are separated by a symbol width (or an integer number of symbol widths). The output of the adder 804 is a difference value for the particular samples. The difference value can be a positive or negative value. Hence, the difference value is supplied to an absolute value circuit 806 that determines that absolute value (or magnitude) of the difference value.

Next, the difference value (i.e., its magnitude) is supplied to an accumulator 808. The accumulator 808 accumulates difference values for 2N−1 samples. The output of the accumulator 808 is an accumulated difference value (e.g., D(x)). The accumulated difference value can also be referred to as a correlation value G(x). The accumulated difference value is supplied to a comparator 810. The comparator 810 determines whether the accumulated difference value is to be utilized as the symbol boundary reference. In this regard, the comparator 810 can compare the current accumulated difference value with one or more previously determined accumulated difference values to select the particular one of the accumulated difference values that offers the best system performance. The comparator 810 may include a register to hold other previously determined accumulated difference values or to hold the currently best accumulated difference value. The symbol boundary timing unit 800 also includes a controller 812. The controller 812 controls overall operation of the symbol boundary timing unit 800 and coordinates the operations with respect to at least the receive buffer 802, the accumulator 808 and the comparator 810.

According to one aspect of the invention, a transmit sequence containing pairs of identical symbols is employed as the training protocol. This protocol has pairs of identical symbols but the transmitted symbols preceding or succeeding the pairs have to be different. One implementation is to have a sequence of DMT symbols which are constructed by a pseudo-random sequence and each individual DMT symbol is repeated once. By identifying the differences between the two consecutive symbols at the receiver end, noise due to inter-carrier and inter-symbol interferences can be estimated for different choices of symbol boundary timing. The choice with the least inter-carrier and inter-symbol interferences can then be selected for symbol framing. The training protocol aims at minimizing inter-carrier and inter-symbol interference, thus outperforms the other methods. It is independent of the value of Lcp, Lcs and $\beta$, where any of them are allowed to be zero.

A receive buffer at the receiver can store four symbols (e.g., 4×dmtsymbol_length) of time samples. The determined symbol boundary is determined at an optimum delay ($m_d$) from the beginning of the received buffer in accordance with Equation 4 below:

$m_d$=x when $$G(x) = \sum_{n=0}^{2*Nsc-1} abs[r(x + dmtsymbol\_length + n) - r(x+n)] \quad \text{(Eq. 4)}$$

is minimized.
where r represents the received buffer contents, abs represents taking the absolute value, and the search is performed over x=0 to 2·dmtsymbol_length−1. Further, the delay $m_d$ is the calculated optimum delay and is implemented as an address index to the received buffer. For simplicity, a receive buffer of length equal to four symbols of time samples is used as an example to illustrate how the invention functions. However, the length of such a receive buffer can be at least down to three symbols of time samples if the use of a circular buffer is considered.

Consider an example in which the FFT size is 1024, the number of subcarriers is 512, the length of the cyclic prefix (Lcp) is 48, the length of the cyclic suffix (Lcs) is 48, and the length of an overlapping region ($\beta$) is 16. Here, the dmtsymbol_length would be 1104 (2·Nsc+Lcp+Lcs−$\beta$). Using such exemplary numbers, Equation 4 is rewritten as:

$$G(x) = \sum_{n=0}^{1023} abs[r(x + 1104 + n) - r(x+n)]. \quad \text{(Eq. 4.1)}$$

This calculation is done for x=0 up to x=2207. This means the symbol delay is searched over a space of two symbol lengths. Note that 80 samples corresponding to the cyclic prefix and suffix are removed at the receiver, thus leaving 1024 samples to be processed. Therefore, there will be 2208 correlation values calculated for each pair of training symbols, i.e., G(0), G(1), ..., G(2207) are to be calculated from Equation 4.1.

To explain further the operation of Equation 4.1, suppose we denote the absolute difference signal as:

$d(n)=abs[r(1104+n)-r(n)]$. (Eq. 4.2)

In order to compute the 2208 correlation values, G(0), ..., G(2207), there are 3231 absolute difference values required. The calculations of these absolute difference values are done as follows:

$d(0)=abs[r(1104)-r(0)]$ $d(1)=abs[r(1105)-r(1)]$ $d(2)=abs[(1106)-r(2)]$

.

.

.

$d(3230)=abs[r(4334)-r(3230)]$ (Eq. 4.3)

The signal samples r are stored in a receive buffer as shown in FIG. 8.

Each of the correlation values are then calculated with a sliding window.

$G(0)=d(0)+d(1)+\ldots+d(1023)$ $G(1)=d(1)+d(2)+\ldots+d(1024)$ $G(2)=d(2)+d(3)+\ldots+d(1025)$

.

.

.

$G(2207)=d(2207)+d(2208)+\ldots+d(3230)$ (Eq. 4.4)

In general, $G(x)=d(x)+d(x+1)+\ldots+d(x+1023)$. (Eq. 4.5)

The optimum symbol boundary is found at $m_d$ if $G(m_d)=\min\{G(0),G(1),\ldots,G(2207)\}$ symbol_boundary=$m_d$ (Eq. 4.6)

Figure 9:
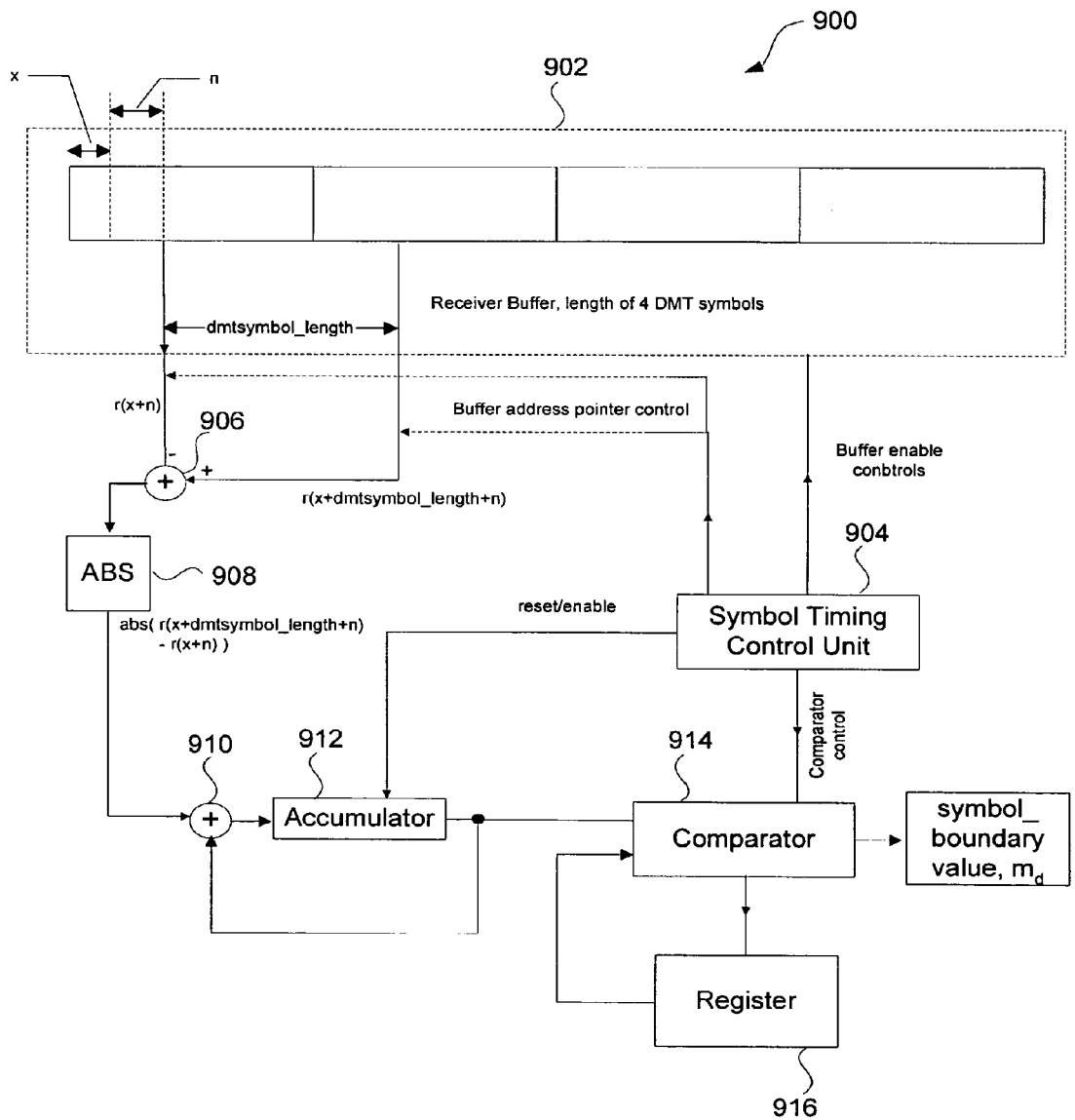
FIG. 9 is block diagram of a symbol boundary determination system according to one embodiment of the invention.

A direct architecture which implements Equation 4.6 is shown in FIG. 9.

The computation load due to the direct implementation architecture is high. For every correlation value G(x) to be calculated, the number of accumulations amounts to 1024. If the instantaneous absolute difference value is stored in a buffer (of size 1024 in this example or up to 2×Nsc in general), the computation of a correlation value G(x) as shown in Equation 4.5 can be re-formulated by a running sum window algorithm:

$G(x)=G(x-1)+d(x+1024)-d(x)$ (Eq. 4.7)

Figure 10:
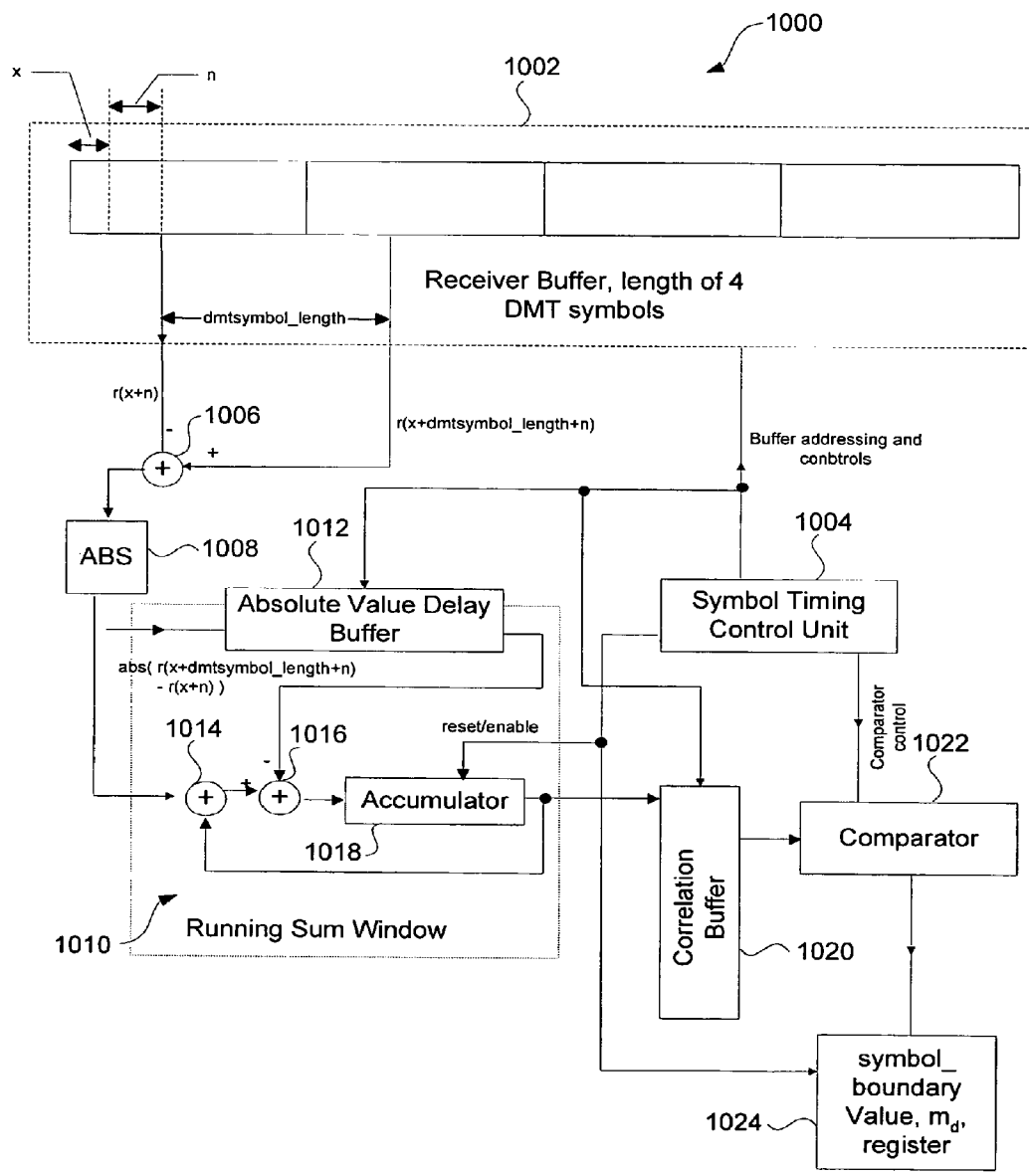
FIG. 10 is a block diagram of a symbol boundary determination system according to another embodiment of the invention.

The architecture of such a computation efficient architecture is shown in FIG. 10. By having a correlation buffer that stores all the correlation values, additional options in choosing the correlation value can be used. For example, more robust search algorithms for the best minimum value can be utilized.

Equation 4 uses an absolute value in forming the correlation values G(x). Alternatively, a magnitude square can be used. That is, the correlation values G(x) can be determined in accordance with the following equation.

$$G(x) = \sum_{n=0}^{2*Nsc-1} abs|r(x + dmtsymbol\_length + n) - r(x+n)|^2 \quad \text{(Eq. 5)}$$

The result of the summation (of Equations 4 or 5) is essentially a measure of the inter-symbol and inter-carrier interference. At any specific value of x, the received sample is calculated as:

r(x+dmtsymbol_length+n)=wanted signal+random-noise(inter-carrier and inter-symbol interference)

r(x+n)=wanted signal+random-noise(inter-carrier and inter-symbol interference).

Due to pairs of identical transmitted signals, the "wanted signal" between r(x+dmtsymbol_length+n) and r(x+n) are identical. Through the subtraction, the "wanted signal" is cancelled out. Further, since the interference results from random signals, the difference between the two interference signals is still a measure of the interference. Therefore, by minimizing the result of the summation across 2*Nsc samples, one obtains the symbol boundary with the least inter-carrier and inter-symbol interference.

The above-described approach to determining symbol boundaries can also be applied to minimize interference due to spectral leakage of crosstalk from other lines in a multiple-input multiple-output system. This is done by having all transceivers, both near-end and far-end, transmit pairs of identical symbols. The determination of the symbol boundary can still be done according to Equations 4 and 5, where the effect of crosstalk is automatically taken into account in the received time domain samples.

The above-described approach to determining symbol boundaries continues to apply even when transmitter windowing is utilized. Namely, Equations 4 and 5 continue to apply. In order to improve the ability to determine the boundary, according to one embodiment, the ideal window for symbol timing detection is a rectangular window with a length equal to one symbol width (i.e., dmtsymbol_length).

When noise cancellation schemes are employed, their contribution should be ignored during the estimation based on Equations 4 and 5. For example, in an echo-cancelled system, the transceiver detecting symbol boundary should be silent and only the far-end transmitters and other near-end transmitters are active. The inter-symbol interference and inter-carrier interference from the far-end transmitter in the direct channel and from both near-end and far-end transmitters in neighboring lines can be measured according to Equations 4 and 5 and echo noise will not be present during the estimation. This approach can give the optimal symbol boundary as long as there is a large degree of echo-cancellation. Similarly, if the effect of near-end crosstalk (NEXT) from near-end transmitters will be cancelled, the near-end transmitters should be silent during the estimation period.

In cases where the channel spread is longer than the cyclic prefix, a time domain equalizer or a per-tone equalizer can be used to shorten the effective channel spread as known to those skilled in the art. For a time domain equalizer or a per-tone equalizer of T taps, Equation 4 can be modified by reducing the range for summation as follows:

$m_d = x$ when $$\sum_{n=0}^{2*Nsc-T} abs[r(x + dmtsymbol\_length + n) - r(x + n)] \text{ is}$$ (Eq. 5.1)

minimized, where r represents the received buffer contents, abs represents taking the absolute value, and the search is performed over x=0 to 2*dmtsymbol_length−1.

Where the channel spread is shorter than the cyclic prefix, there may be multiple equivalent values of $m_d$ where the inter-carrier and inter-symbol interference are the same. Since the effective channel delay is dependent on the value of $m_d$ chosen, $m_d$ should be selected such that the effective channel delay is minimized. In this perspective, if there exists a range of delay values which all correspond to the same level of inter-carrier and inter-symbol interference, the smallest $m_d$ value can be chosen. This, in turn, leads to a smaller value for the cyclic suffix needed and thus reduces the amount of overhead.

FIG. 9 is block diagram of a symbol boundary determination system 900 according to one embodiment of the invention. The symbol boundary determination system 900 represents one implementation of Equation 4 noted above, which determines a symbol boundary.

The symbol boundary determination system 900 includes a receiver buffer 902 that, in this embodiment, stores four DMT symbols. A symbol timing control unit 904 coordinates operation of the symbol boundary determination system 900. In this regard, the symbol timing control unit 904 supplies buffer enable control signals to the receiver buffer 902, and supplies buffer address pointer controls to the receiver buffer 902. One of the buffer address pointers is denoted r(x+n), and the other buffer address pointer is denoted r(x+dmtsymbol_length+n), where r is the contents of the receiver buffer 902 at the particular address, x represents a search range from 0 to 2*dmtsymbol_length−1, and n represents the particular samples to be accumulated.

The samples of the receiver buffer 902 as indexed by the buffer address pointers are supplied to an adder 906 that performs a subtraction operation. The result from the adder 906 is supplied to an absolute value (abs) circuit 908. The output of the absolute value circuit 908 is a partial correlation value represented by abs(r(x+dmtsymbol_length+n)−r(x+n)). The partial correlation value is supplied to an adder 910 which adds the current partial correlation value with an accumulated correlation value produced by an accumulator 912. The symbol timing control unit 904 also supplies a reset/enable signal to the accumulator 912. The output of the accumulator 912 is a current correlation value G(x) which is supplied to a comparator 914. The comparator 914 selects a minimum correlation value from the current correlation value supplied by the accumulator 912 with a previous minimum correlation value stored in register 916. The symbol timing control unit 904 can send a minimum value control signal to the comparator 914. In response to the minimum value control signal, the output of the comparator 914 is a symbol boundary value. For example, the symbol boundary value can be an optimum delay $(m_d)$ from the beginning of the receiver buffer 902, thereby specifying the symbol boundary.

FIG. 10 is a block diagram of a symbol boundary determination system 1000 according to another embodiment of the invention. The symbol boundary determination system 1000 represents a more efficient computational scheme than that utilized by the symbol boundary determination system 900 illustrated in FIG. 9.

The symbol boundary determination system 1000 includes a receiver buffer 1002 that stores four DMT symbols. A symbol timing control unit 1004 supplies buffer addressing and control signals to the receiver buffer 1002 so that a pair of samples can be retrieved from the receiver buffer 1002 and supplied to an adder 1006. One of the samples supplied from the receiver buffer 1002 to the adder 1006 is denoted r(x+n), and another of the samples supplied from the receiver buffer 1002 to the adder 1006 is denoted r(x+dmtsymbol_length+n). The adder 1006 subtracts one of the retrieve samples from the other to produce a difference value. The difference value is supplied to an absolute value (abs) circuit 1008 which produces a value. The output of the absolute value circuit 1008 is a partial correlation value represented by abs(r(x+dmtsymbol_length+n)−r(x+n)).

The value from the absolute value circuit 1008 is supplied to a running sum window 1010. More particularly, the value from the absolute value circuit 1008 is supplied to an absolute value delay buffer 1012 and an adder 1014. The delayed value from the absolute value delay buffer 1012 is supplied to an adder 1016. The adder 1016 also includes a sum from the adder 1014. The adder 1016 subtracts the delayed value from the sum supplied by the adder 1014 to produce a modified sum that is supplied to an accumulator 1018. Once all of the accumulations have occurred, the output of the accumulator 1018 is a correlation value. That is, the output of the accumulator 1018 is supplied to the adder 1014 so that a partial correlation value can accumulate to produce a final correlation value. The final correlation value is applied to a correlation buffer 1020. The correlation buffer 1020 can store a plurality of final correlation values that are being produced by the symbol boundary determination system 1000. The symbol timing control unit 1004 also supplies control signals to the absolute value delay buffer 1012, the accumulator 1018 and the correlation buffer 1020. The absolute value delay buffer 1012, the adder 1014, the adder 1016 and the accumulator 1018 can be considered as the running sum window 1010.

The symbol boundary determination system 1000 also includes a comparator 1022. The comparator 1022 can evaluate the final correlation values within the correlation buffer 1020 to select a minimum correlation value. The minimum correlation value that is chosen by the comparator 1022 is used to determine a symbol boundary indicated by a symbol boundary value. For example, the symbol boundary value can be an optimum delay ($m_d$) from the beginning of the receiver buffer 1002, thereby specifying the symbol boundary. The symbol timing control unit 1004 also supplies control signals to the comparator 1022 and a symbol boundary value register 1024, which stores the selected final correlation value chosen by the comparator 1022.

Figure 11:
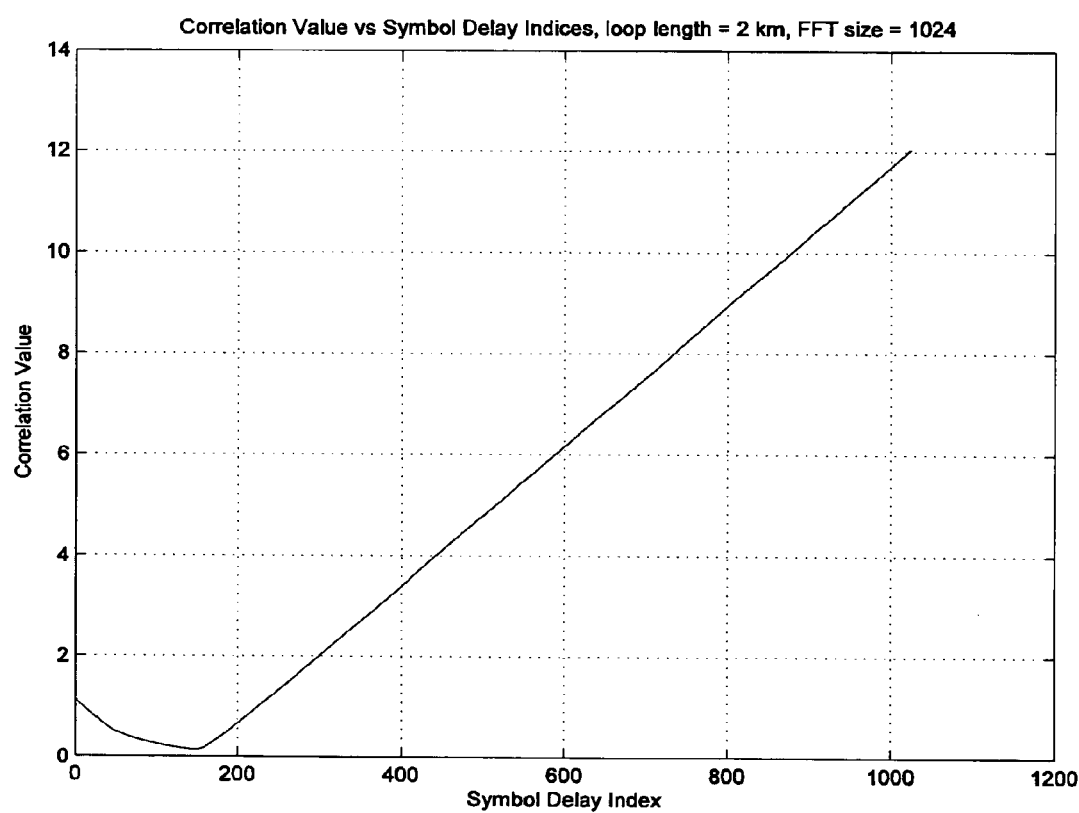
FIG. 11 shows an exemplary graph of correlation values plotted against the symbol delay indices.

FIG. 11 shows an exemplary graph of correlation values plotted against the symbol delay indices. In this example, the size of FFT used is 1024 and a typical 26 American Wire Gauge (awg) cable channel with a loop length of 2 km is modeled. The minimum correlation value is found at the delay index equal to 147. That is, in this particular example, $m_d$=147. The modeling parameters as well as the cable model are referred to in John A. C. Bingham, "ADSL, VDSL, and Multicarrier Modulation," Wiley, ISBN 0-471-20072-7, which is hereby incorporated herein by reference.

The determination of the optimum symbol delay index is based on a sequence of pseudo-random symbols containing identical pairs in order to reduce the statistical noise due to the correlation process. Equation 4 only describes the correlation process of a training symbol pair. To extend it for a sequence of identical training pairs, Equation 4 is modified for the kth training pair as:

$$G(x, k) = \sum_{n=0}^{2 \cdot Nsc-1} \text{abs}[r(x + \text{dmtsymbol\_length} + n) - r(x + n)]. \quad \text{(Eq. 6)}$$

The representative iterative calculation of the G(x, k) values for each training pair is as follows. The FFT size assumed is 1024, the number of subcarriers is 512, the length of the cyclic prefix (Lcp) is 48, the length of the cyclic suffix (Lcs) is 48, and the length of an overlapping region (β) is 16. Here, the dmtsymbol_length would be 1104 (2·Nsc+Lcp+Lcs−β). When the calculation of the last correlation value, i.e., G(2207), is finished, the address pointers which are used to point to the receive buffer are reset to the addresses that contain r(0) and r(1104), which are the beginning addresses for calculating G(0) of the (k+1)$^{th}$ training pair, namely, G(0, k+1). Hence, for N training symbol pairs, the correlation values that are collected as a result of applying Equation 6 are:

0$^{th}$ symbol pair: G(0,0)

G(1,0)

:

:

G(2207,0)

1$^{st}$ symbol pair: G(0,1)

G(1,1)

:

:

G(2207,1)

:

:

:

k$^{th}$ symbol pair: G(0,k)

G(1,k)

G(2207,k)

:

:

:

(N−1)$^{th}$ symbol pair: G(0,(N−1))

G(1,(N−1))

:

:

G(2207,(N−1)). (Eq. 7)

To select an optimum delay index, $m_d$, there are two approaches. The first approach is to average the N collected correlation values at each delay index and then subsequently to select the minimum value. The index that corresponds to the minimum correlation value is the optimum delay index. If we denote the average correlation value at delay index x as $\overline{G}(x)$, then $\overline{G}(m_d) = \min\{\overline{G}(0), \overline{G}(1), \ldots, \overline{G}(2207)\}$ symbol_boundary=$m_d$, optimum delay index (Eq. 8)

$\overline{G}(x)$ is calculated as $$\overline{G}(x) = \sum_{k=0}^{N-1} G(x, k) \quad \text{(Eq. 9)}$$
$$= G(x, 0) + G(x, 1) + G(x, 2) + \ldots + G(x, N-1)$$

Alternatively, $\overline{G}(x)$ can also be calculated as $$\overline{G}(x) = \frac{1}{N} \cdot \sum_{k=0}^{N-1} G(x, k) \quad \text{(Eq. 10)}$$

$$= \frac{1}{N} \cdot [G(x, 0) + G(x, 1) +$$
$$G(x, 2) + \ldots + G(x, N-1)]$$

The second approach of finding the optimum delay index is done by identifying the delay index of the minimum correlation value for each training pair and followed by averaging the identified delay index over all training pairs. Hence, with reference to Equation 8, we first perform $0^{th}$ symbol pair: $G(x_0, 0) = \min\{G(0,0), G(1,0), \ldots, G(2207,0)\}$ $m_d(0) = x_0$ $1^{st}$ symbol pair: $G(x_1, 1) = \min\{G(0,1), G(1,1), \ldots, G(2207,1)\}$ $m_d(1) = x_1$

:

:

:

$k^{th}$ symbol pair: $G(x_k, k) = \min\{G(0,k), G(1,k), \ldots, G(2207,k)\}$ $m_d(k) = x_k$

:

:

:

$(N-1)^{th}$ symbol pair: $G(x_k, N-1) = \min\{G(0, N-1), G(1, N-1), \ldots, G(2207, N-1)\}$ $m_d(N-1) = x_{N-1}.$ (Eq. 11)

In the above equation, $m_d(k)$, is the delay index corresponding to the minimum correlation values for the $k^{th}$ symbol.

$$\text{averaged\_m}_d = \frac{x_0 + x_1 + \ldots + x_{N-1}}{N} \quad \text{(Eq. 12)}$$

symbol_boundary = averaged_$m_d$

The length of the training sequence can vary for different cable loop lengths and, in general, the shorter the cable loop length, the shorter the training sequence that is required. Typically, as the cable loop length varies from 300 m (short loop) to 2 km (long loop), the required training sequence varies from 500 symbols (250 identical pairs) to 1500 symbols (750 identical pairs).

Although the above-discussion concentrates on a time domain approach to determining symbol boundaries, the invention is also suitable for use as a frequency domain approach. The frequency domain approach can, for example, be used with ADSL or VDSL systems. The advantage of processing the training symbols in the frequency domain is to allow a range of information bearing subcarriers (tones) in addition to detecting the symbol boundary with the identical pseudo-random symbols carried in the subcarrier (tones) other than the information bearing subcarriers.

To extend this detection method, the training pairs in the frequency domain must be modified and an example training pair in the frequency domain is shown as follows:

symbol A0: tone_1: information bearing CC
tone_2: X2 (pseudo-random 4-QAM symbols)
tone_3: information bearing DD
tone_4: X4 (pseudo-random 4-QAM symbols)
tone_5: information bearing EE
tone_6: X6 (pseudo-random 4-QAM symbols)
tone_7: information bearing FF
tone_8: X8 (pseudo-random 4-QAM symbols)
symbol A1: tone_1: information bearing CC
tone_2: X2 (pseudo-random 4-QAM symbols)
tone_3: information bearing DD
tone_4: X4 (pseudo-random 4-QAM symbols)
tone_5: information bearing EE
tone_6: X6 (pseudo-random 4-QAM symbols)
tone_7: information bearing FF
tone_8: X8 (pseudo-random 4-QAM symbols)

In the above example, the DMT symbol contains only eight tones, but for any practical system, many more tones shall be used. For example, 255 tones are used in ADSL. It is shown in the example that the even tones of the training pair contain identical random signals and these are X2, X4, X6, and X8, while all the odd tones contain system information to be transmitted between the customer's premises (CP) and the central office (CO). The same system information may be carried by the training pair. Note that, in general, any number of tones (including zero) may be used for system information and a minimum of one tone should be used as the training tone. The use of pseudo-random 4-QAM symbols as the training symbol is also for illustrative purposes and other training symbols could be used.

Recall Equation 4, $$G(x) = \sum_{n=0}^{2 \ast Nsc - 1} \text{abs}[r(x + \text{dmtsymbol\_length} + n) - r(x + n)]$$

wherein dmtsymbol_length is the length of a DMT symbol, and Nsc is the total number of subcarriers (an even number).

For a delay index x, two sequences in the frequency domain are defined, one, R0(x), corresponding to the term r(x+n), and the other, R1(x), corresponding to the term r(x+dmtsymbol_length+n).

$R0(x,k) = \text{FFT}\{r(x+n), n=0,1,2,\ldots,2 \cdot Nsc-1\}\ k= 0,1,2,\ldots,2 \cdot Nsc-1$ (Eq. 13)

$R1(x,k) = \text{FFT}\{r(x+\text{dmtsymbol\_length}+n), n= 0,1,2,\ldots,2 \cdot Nsc-1\}\ k=\cdot Nsc-1$ (Eq. 14)

The correlation values between a training pair are calculated as:

$$G(x) = \sum_{k \in I} f[R1(k) - R0(k)]. \quad \text{(Eq. 15)}$$

where I is the set of tone indices that contains the random symbols, e.g. 2, 4, 6, ..., Nsc−2, and where the function $f[.]$ can take on an absolute value, i.e. $f[.]=\text{abs}[.]$; or a magnitude square function, i.e. $f[.]=\text{abs}[.]^2$. Note also that the sum is only performed over the indices defined for the set of the random symbol bearing tones, which is indicated as k∈I.

The symbol boundary is found by minimizing Equation 15 over all possible delay index x.

$G(m_d) = \min\{G(0), G(1), \ldots, G(2207)\}$ symbol_boundary=$m_d$

Thus far, the selection of the symbol boundary for one training symbol pair is described. If there is a sequence of training symbol pairs, the approaches discussed above for time domain detection also applies to the frequency domain based approaches.

Figure 12:
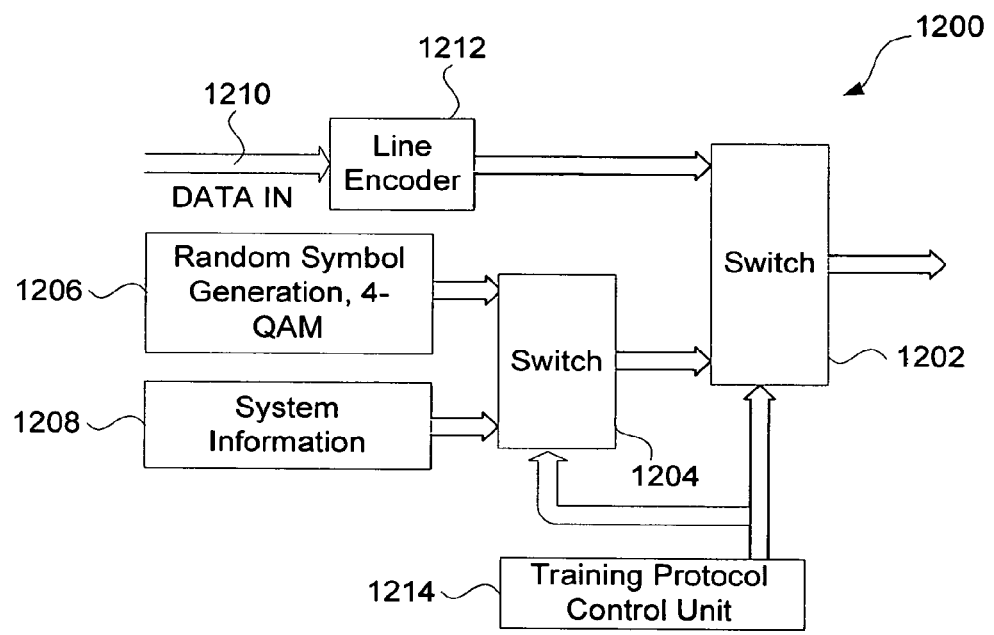
FIG. 12 illustrates a block diagram of an initial section of a transmitter according to one embodiment of the invention.

FIG. 12 illustrates a block diagram of an initial section 1200 of a transmitter according to one embodiment of the invention. The initial portion 1200 can replace an initial portion of the transmitter 100 illustrated in FIG. 2A, whereby the initial portion 1200 would replace the blocks 102 through 110 of the transmitter 100 as illustrated in FIG. 2A. The initial portion 1200 includes a first switch 1202 and a second switch 1204. The second switch 1204 receives training symbols 1206 and system information 1208 as inputs. The second switch 1204 then selects one of the training symbols 1206 or the system information 1208 as an output that is supplied to the first switch 1202. The first switch 1202 also receives data 1210 that is input and converted by a line encoder 1212 into encoded data which is supplied to the first switch 1202. The first switch 1202 selects one of the encoded data and the output of the second switch 1204 as an output that is supplied to a DMT demodulation unit of the receiver. The initial portion 1200 also includes a training protocol control unit 1214 that supplies control signals to the first switch 1202 and the second switch 1204. The training protocol control unit 1214 controls the operation of the first switch 1202 and the second switch 1204 so that some tones contain system information, while other tones contain training symbols. Further, the training protocol control unit 1214 controls whether to transmit training symbols or data from the encoder.

Figure 13:
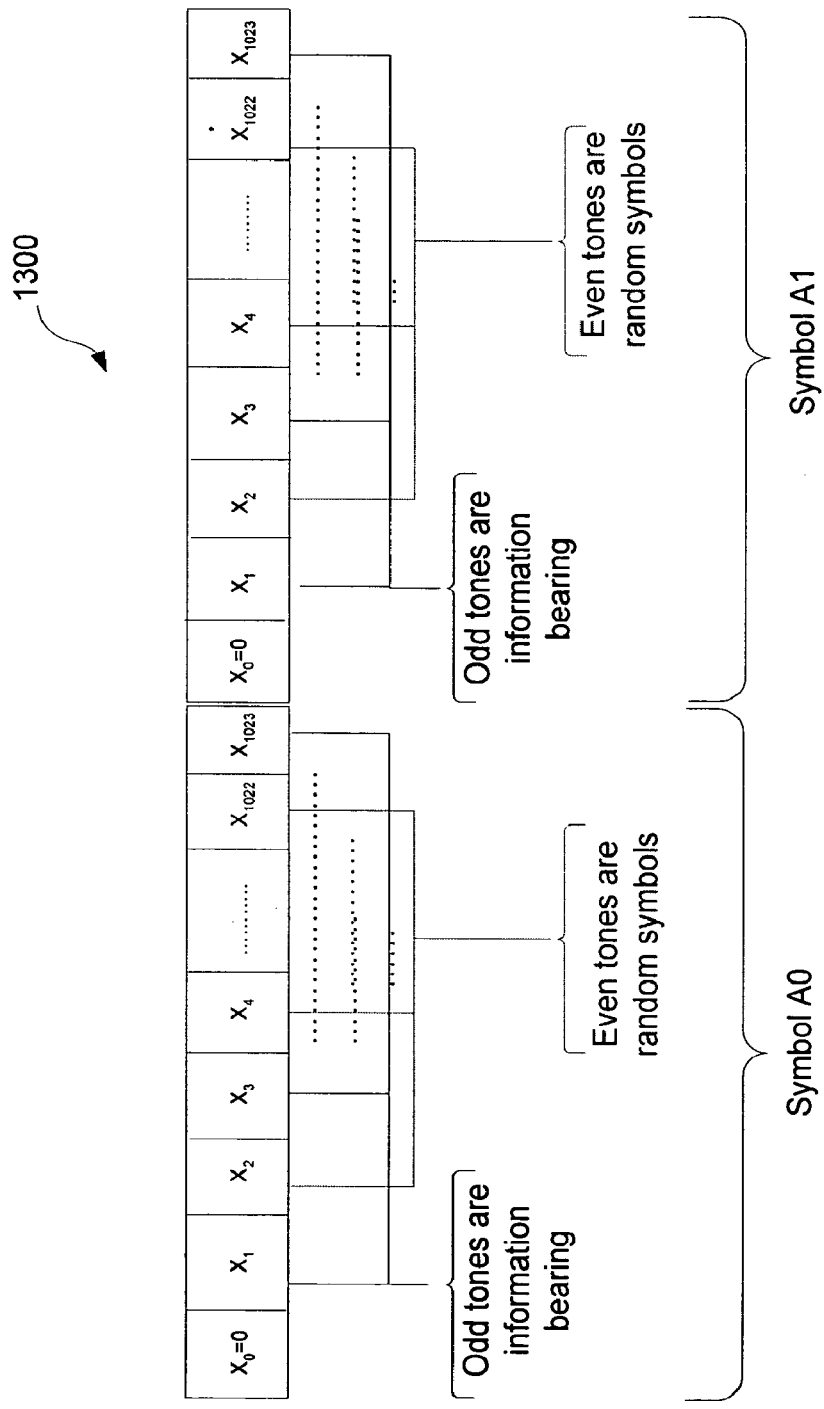
FIG. 13 illustrates a pair of representative training symbols in the frequency domain according to one embodiment of the invention.

FIG. 13 illustrates a pair of representative training symbols 1300 in the frequency domain according to one embodiment of the invention. For example, the pair of training symbols 1300 represents a training symbol pair frequency domain based processing. Note, odd tones contain system information, while even tones contain training symbol information. Also note that each of the training symbols in the pair of training symbols 1300 shown in FIG. 13 are identical. The pair of training symbols 1300 illustrated in FIG. 13 is an example for a VDSL system with 512 subcarriers (FFT size=1024).

It should be understood that the invention can generally permit training symbols in the frequency domain to contain both training symbol information as well as other non-training data. In other words, if desired, only a subset of the tones need be used to carry training symbol information. For example, as shown in FIG. 12, the second switch 1204 can be controlled to interleave training symbol information with non-training data. In the example shown in FIG. 13, odd tones of training symbols carry non-training data (e.g., system information), whereas even tones carry training symbol information. The training symbol information can have a random or pseudo-random characteristic. However, the training symbols in the frequency domain can interleave training symbol information with non-training data in various other ways besides alternating between even and odd tones.

Figure 14:
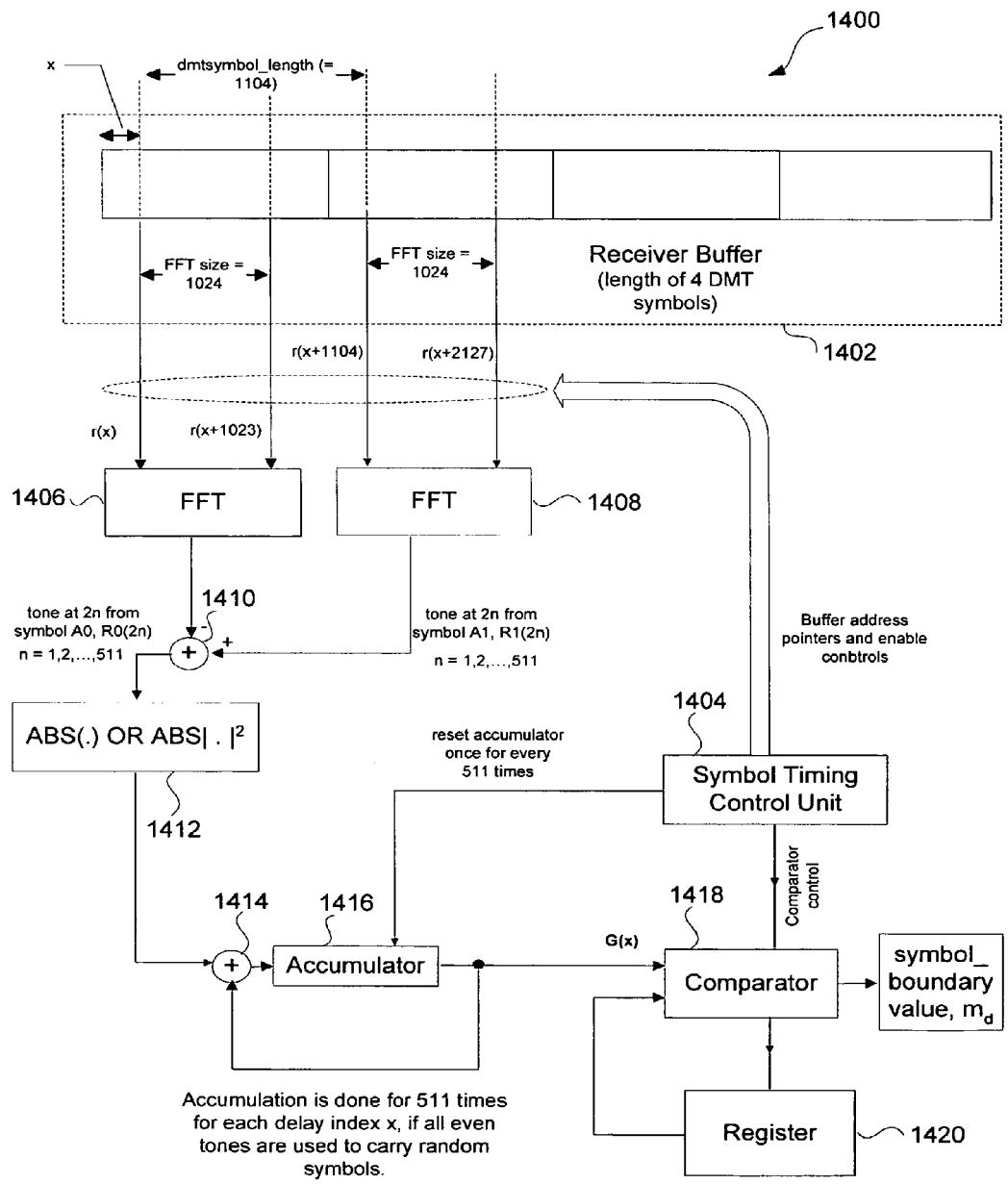
FIG. 14 is a block diagram of a symbol boundary determination system according to another embodiment of the invention.

FIG. 14 is a block diagram of a symbol boundary determination system 1400 according to another embodiment of the invention. The symbol boundary determination system 1400 is suitable for use with frequency domain based processing. In contrast, the symbol boundary determination system 900 illustrated in FIG. 9 and the symbol boundary determination system 1000 as illustrated in FIG. 10 are suitable for use in time domain based processing.

The symbol boundary determination system 1400 includes a receiver buffer 1402 that, in this embodiment, stores four DMT symbols. The receiver buffer 1402 can be accessed by buffer addressed pointers and enable control signals provided by a symbol timing control unit 1404. The addressed samples within the receiver buffer 1402 from a first DMT symbol are supplied to a first Fast Fourier Transform (FFT) 1406, while the samples pertaining to a second DMT symbol within the receiver buffer 1402 are supplied to a second FFT 1408. For example, with the FFT size at 1024, the first FFT 1406 receives samples r(x) through r(x+1023) and the second FFT 1408 receives samples r(x+1104) through r(x+2127). The FFTs 1406 and 1408 output complex values that are supplied to an adder 1410 that performs a subtraction operation to produce a difference value. The difference value produced by the adder 1410 is supplied to an absolute value (or absolute value squared) circuit 1412. The output from the absolute value circuit 1412 is a partial correlation value.

The partial correlation value is then supplied to an adder 1414. The adder 1414 adds the partial correlation value with an accumulated correlation value that is stored in an accumulator 1416. The sum produced by the adder 1414 is then stored in the accumulator 1416 as a next accumulated correlation value. For example, in a system using 512 subcarriers, the accumulation would be performed 511 times. A reset signal is supplied by the symbol timing control unit 1404 to the accumulator 1416. The output of the accumulator 1416 following the accumulation period is a final correlation value G(x). The final correlation value is supplied to a comparator 1418. The comparator 1418 determines a minimum correlation value. In this regard, the comparator 1418 receives a comparator control signal from the symbol timing control unit 1404. The comparator 1418 determines whether the final correlation value provided by the accumulator 1416 is less than a previous minimum correlation value stored in a register 1420. After all of the final correlation values have been processed, a minimum final correlation value is output by the comparator 1418 and used to set the symbol boundary based on a symbol boundary value ($m_d$).

The invention can be implemented by software, hardware or a combination of hardware and software. The hardware can be custom circuitry, customized circuitry (ASIC) and/or general circuitry (e.g., digital signal processor). The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the following advantages.

One advantage of the invention is the ability to accurately determine symbol boundaries in a multicarrier data transmission system. Another advantage of the invention is the ability to obtain higher data transmission rates because symbol boundary timing can be chosen with regards to interference.

In one embodiment, a symbol boundary can be selected at the position at which the amount of interference is minimized. In this manner, the symbol boundary timing can be optimized. As a consequence, the data rate the multicarrier data transmission system can support can be increased. The invention is particularly useful in situations in which the system has a long loop.

Another advantage of the invention is that it can be implemented using a time domain or a frequency domain training sequence. Such flexibility allows the symbol boundary training protocol to adapt to various different implementations.

Still another advantage of the invention is that the symbol boundary training protocol can make use of a non-data aided training sequence. In other words, the receiver does not care what the transmitter is sending. As a result, the training of the receiver is more elegant and requires less control.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A symbol timing unit configured to produce a plurality of difference values for a plurality of different potential symbol timing boundaries, the symbol timing unit comprising:
    a subtractor configured to subtract (1) a first sample value of a first training symbol from (2) a second sample value of a second training symbol to produce a first difference value of the plurality of difference values;
    an absolute value circuit configured to calculate absolute value or magnitude;
    an accumulator configured to accumulate an absolute value or magnitude of the first difference value with an absolute value or magnitude of a second difference value of the plurality of difference values computed by the absolute value circuit, wherein the second difference value was previously computed;
    a controller configured to facilitate repeating of the subtracting in the subtractor and accumulating in the accumulator over at most a factor of a symbol length;
    an estimator configured to estimate noise due to inter-carrier and inter-symbol interference for at least one of the plurality of different potential symbol timing boundaries; and
    a comparator configured to select, based on the accumulated difference value produced by the accumulator, a choice of symbol boundary timing with substantially a least estimated noise due to inter-carrier and inter-symbol interference.

2. A symbol timing unit as recited in claim 1, further comprising:
    a receive buffer configured to receive the first training symbol and the second training symbol of a plurality of symbols.

3. A symbol timing unit as recited in claim 1, wherein the plurality of difference values pertain to the estimated noise due to inter-carrier and inter-symbol interferences for at least one of the plurality of different potential symbol timing boundaries.

4. A symbol timing unit as recited in claim 3, wherein the symbol timing unit selects a first of the plurality of different potential symbol timing boundaries with the least estimated noise due to inter-carrier and inter-symbol interference as a selected symbol timing boundary.

5. A symbol timing unit as recited in claim 1, wherein the symbol timing unit determines the plurality of difference values for the plurality of different symbol timing boundaries based on time domain processing.

6. A symbol timing unit as recited in claim 1, wherein the symbol timing unit determines the plurality of difference values for the plurality of different potential symbol timing boundaries based on frequency domain processing.

7. A symbol timing unit as recited in claim 1, wherein the symbol timing unit produces the plurality of difference values with respect to at least one pair of identical training symbols.

8. A symbol timing unit as recited in claim 1, wherein the first training symbol is a Quadrature Amplitude Modulation (QAM) or Phase Shift Keying (PSK) symbol.

9. A symbol timing unit as recited in claim 1, wherein the first training symbol includes at least one of a cyclic prefix and a cyclic suffix.

10. A symbol timing unit as recited in claim 1, wherein the first training symbol has a random or pseudo-random characteristic.

11. A symbol timing unit as recited in claim 1, wherein the comparator selects the symbol boundary timing to minimize the noise due to inter-carrier and inter-symbol interference.

12. A symbol timing unit as recited in claim 1, wherein the symbol timing unit is included in at least one receiver of a multicarrier data transmission system.

13. A symbol timing unit as recited in claim 12, wherein the receiver further comprises:
    an analog to digital converter for converting analog signals into digital samples.

14. A symbol timing unit as recited in claim 13, wherein the receiver further comprises:
    a multicarrier demodulation unit for demodulating the digital samples into the plurality of symbols.

15. A symbol timing unit as recited in claim 14, wherein the receiver further comprises:
    a line decoder that decodes the plurality of symbols into data.

16. A symbol timing unit as recited in claim 12, wherein the multicarrier data transmission system further comprises:
    at least one transmitter, the transmitter including at least:
        a line encoder that encodes data into at least one of the plurality of symbols, wherein the plurality of symbols comprises the first training symbol and the second training symbol;
        a switch that selects symbols for transmission from either the first and second training symbols or the symbols pertaining to the encoded data from the line encoder;
        a multicarrier modulation unit for modulating the plurality of symbols into modulated symbols; and
        a digital-to-analog converter for converting the modulated symbols into analog signals.

17. A symbol timing unit as recited in claim 16, wherein the multicarrier data transmission system further comprises another switch that supplies symbols from either the training symbols or system information to the switch, and
    wherein the switch that selects symbols for transmission operates to select either the symbols pertaining to the encoded data from the line encoder or from the symbols provided by the other switch.

18. A symbol timing unit as recited in claim 17, wherein the transmitter further comprises a control unit, and
    wherein the switch and the other switch are controlled by the control unit.

19. A symbol timing unit as recited in claim 17, wherein the other switch is used to interleave training symbol information with the system information.

20. A symbol timing unit as recited in claim 16, wherein the transmitter transmits at least one pair of identical training symbols.

* * * * *